United States Patent
Nakamura

(10) Patent No.: US 8,898,512 B2
(45) Date of Patent: Nov. 25, 2014

(54) STORAGE SYSTEM AND CONTROL METHOD

(75) Inventor: Daiya Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 524 days.

(21) Appl. No.: 13/116,236

(22) Filed: May 26, 2011

(65) Prior Publication Data

US 2012/0042203 A1    Feb. 16, 2012

(30) Foreign Application Priority Data

Aug. 10, 2010  (JP) ................................. 2010-179763

(51) Int. Cl.
*G06F 11/00* (2006.01)
*G06F 11/07* (2006.01)
*G06F 11/20* (2006.01)
*G06F 11/10* (2006.01)

(52) U.S. Cl.
CPC ........ *G06F 11/0793* (2013.01); *G06F 11/2087* (2013.01); *G06F 11/2082* (2013.01); *G06F 11/1076* (2013.01); *G06F 11/0727* (2013.01); *G06F 2211/1059* (2013.01)
USPC ......................................................... 714/6.1

(58) Field of Classification Search
None
See application file for complete search history.

(56) References Cited

U.S. PATENT DOCUMENTS

| | | | |
|---|---|---|---|
| 6,981,173 B2* | 12/2005 | Ferguson et al. | 714/5.11 |
| 7,571,356 B2 | 8/2009 | Inoue et al. | |
| 8,001,425 B2* | 8/2011 | Mazina | 714/42 |
| 2008/0010403 A1* | 1/2008 | Tsukada et al. | 711/114 |
| 2008/0010547 A1* | 1/2008 | Nakashima et al. | 714/43 |
| 2009/0240976 A1* | 9/2009 | Bullen et al. | 714/5 |

FOREIGN PATENT DOCUMENTS

| | | |
|---|---|---|
| JP | 2006-285519 A | 10/2006 |
| JP | 2007-141185 A | 6/2007 |
| JP | 2007-316879 A | 12/2007 |

\* cited by examiner

*Primary Examiner* — Michael Maskulinski
(74) *Attorney, Agent, or Firm* — Fujitsu Patent Center

(57) ABSTRACT

A storage system includes plural storage devices, a controller configured to transmit an access request for controlling an access to at least one of the storage devices, a switching part configured to receive the access request from the controller to select the one of the storage devices based on the access request received from the controller, and a proxy response part configured to transmit, if the selected storage device has failed, a response to the access request instead of the failed storage device responding.

17 Claims, 29 Drawing Sheets

| ADDRESS | ACCESS DESTINATION PORT | CONDITION |
|---|---|---|
| 0x01 | 1 | Normal |
| 0x02 | 2 | Normal |
| 0x03 | 3 | Normal |
| ⋮ | ⋮ | ⋮ |
| 0xEF | 5 | Recovering |

| ADDRESS | ACCESS DESTINATION PORT | CONDITION |
|---|---|---|
| 0x01 | 1 | Normal |
| 0x02 | 2 | Normal |
| 0x03 | 3 | Broken |
| ⋮ | ⋮ | ⋮ |
| 0xEF | 5 | Normal |

| DATA UPDATE DESIRED DISK | DATA UPDATE DESIRED ADDRESS |
|---|---|
| Disk1 | STRIPE 1 |
| Disk1 | STRIPE 2 |
| Disk2 | STRIPE 19 |
| ⋮ | ⋮ |
|  |  |

| ADDRESS | ACCESS DESTINATION PORT |
|---|---|
| 0x01 | 1 |
| 0x02 | 2 |
| 0x03 | 3 |
| ⋮ | ⋮ |
| 0xEF | 5 |

500

STORAGE SYSTEM AND CONTROL METHOD

CROSS-REFERENCE TO RELATED APPLICATION

This patent application is based upon and claims the benefit of priority of Japanese Patent Application No. 2010-179763 filed on Aug. 10, 2010, the entire contents of which are incorporated herein by reference.

FIELD

The embodiments discussed herein are related to a storage system and a control method.

BACKGROUND

In a storage system including plural storage devices, such as a RAID (Redundant Array of Inexpensive Disks) composed of plural magnetic disks, technologies of rapidly restoring system failures are proposed. For example, Japanese Laid-Open Patent Application Publication No. 2007-316879 discloses a technology for significantly reducing automatic restoration time to restore a loop of the loop-connected storage devices. In this example, when loop abnormality is detected in the loop-connected storage devices, the loop-connected storage devices are diagnosed in parallel. Thus, automatic restoration of the loop may be implemented in a short time.

Similarly, Japanese Laid-Open Patent Application Publication No. 2007-141185 discloses a technology for detecting a failure of disk drives in an early stage, so that usability of the drives may be immediately restored. In this example, when an error is detected in a switching circuit that is connected between the disk drives and a low order communication controller, the detected error is reported from an error monitor to the low order communication controller. Accordingly, the restoration of the disk drive failure may be immediately initiated.

Further, Japanese Laid-Open Patent Application Publication No. 2006-285519 discloses a technology for quickly specifying a failure of a data transfer system. In this example, an upstream device transmits diagnostic data failure to a downstream device and also to the upstream device itself, so that the normality of the transmitted diagnostic data may be evaluated. If the downstream device abnormally receives the diagnostic data transmitted from the upstream device, an interval between the upstream device and the downstream device is specified as a failed interval. The upstream device subsequently receives the diagnostic data transmitted by its own receiver to carry out return diagnosis, thereby further specifying location of the failure.

SUMMARY

In one embodiment, there is provided a storage system that includes plural storage devices, a controller configured to transmit an access request for controlling an access to at least one of the storage devices, a switching part configured to receive the access request from the controller to select one of the storage devices based on the access request received from the controller, and a proxy response part configured to transmit, if the selected storage device has failed, a response to the access request instead of the failed storage device responding.

The object and advantages of the invention may be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIGS. 7A and 7B are diagrams illustrating examples of an address management table;

FIG. 8 is a diagram illustrating an example of an update data management table;

FIG. 27 is a diagram illustrating an address management table in the comparative example of the storage system;

DESCRIPTION OF EMBODIMENTS

The above-described related art storage systems generally include a diagnostic process function such as a storage device test, or a recovery process function such as software reset or hardware reset functions to secure a continuous use of the storage devices in the storage systems even if any of the storage devices have failed.

Although the related art storage systems include the diagnostic process function or the recovery process function, these functions may need carrying out an operating process that differs from an input/output (I/O) process carried out between controller side and the storage devices. Thus, it may generally take a long time for the controller to detect conditions of the storage devices. The controller in the storage system is configured to determine if predetermined time has elapsed for the storage device recovery. If the recovery process takes a long time, the controller may determine that the storage devices have failed, despite the fact that the storage devices are continuously usable after having undergone the recovery process. Thus, the recovery process carried out on the failed storage devices may be spoiled.

Accordingly, embodiments may provide a storage system and a control method for the storage system that may be capable of providing continuous access to the storage devices even if the storage devices have failed.

A description is given, with reference to the accompanying drawings, of the embodiments.

[a] First Embodiment

Figure 1:
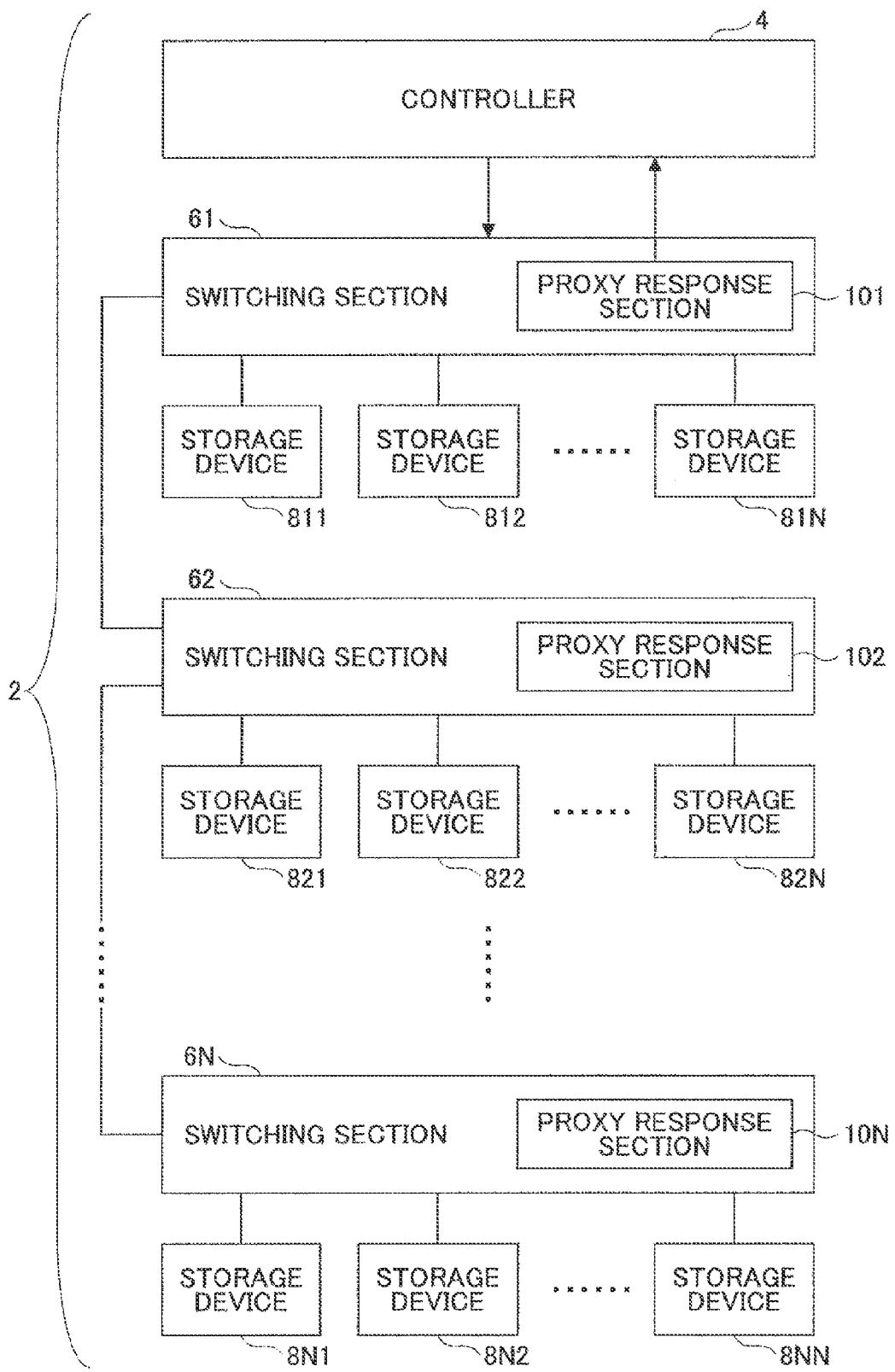
FIG. 1 is a diagram illustrating an example of a storage system according to a first embodiment.

First, a storage system 2 according to a first embodiment is described with reference to FIG. 1. FIG. 1 illustrates an example of the storage system 2 according to the first embodiment.

The storage system 2 according to the first embodiment is a data storage system including plural storage parts such as a disk array subsystem. The storage system 2 is connected to a not-illustrated host computer such that the storage system 2 is configured to provide data to the host computer or store data transmitted from the host computer in response to an access request from the host computer.

As illustrated in FIG. 1, the storage system 2 includes a controller 4, switching sections 61, 62 to 6N, storage devices 811, 812 to 81N, 821, 822 to 82N, 8N1, and 8N2 to 8NN. Although the storage system 2 according to the first embodiment includes plural switching sections 61, 62 to 6N, the storage system 2 may include a single switching section such as the switching section 61.

The switching sections 61, 62 to 6N respectively includes proxy response sections 101, 102 to 10N configured to transmit responses instead of the storage devices 811, 812 to 8NN. In this example, the proxy response section 101 resides in the switching section 61, the proxy response section 102 resides in the switching section 62, and the proxy response section 10N resides in the switching section 6N.

The controller 4 is connected to the existing host computer and configured to transmit or receive data with the host computer, control the switching sections 61, 62 to 6N, and control access to a single storage device or plural storage devices.

The switching sections 61, 62 to 6N are examples of selecting parts to select the storage devices 811, 812 to 8NN respectively connected to the switching sections 61, 62 to 6N. The switching sections 61, 62 to 6N are configured to receive an access request or access requests from the controller 4 and select access target storage devices.

The storage devices 811, 812 to 8NN are examples of data recording media, and backend loops configured to circulate information are formed between the controller 4 and the storage devices 811, 812 to 8NN. The storage devices 811, 812 to 8NN may be semiconductor disk-like recording media such as solid state drives (SSD) or hard disk drives for use in reading or writing data. The storage system 2 employs a redundant configuration such as a RAID system to store data in the storage devices 711, 812 to 8NN for improving the reliability of stored data and the reliability of the storage system 2 itself. The backend loop is an example of a accelerating part to speed up the data transfer.

In the storage system 2, if a failure occurs in any of the storage devices 811, 812 to 8NN that receive the access requests such as IO instructions from the controller 4, the corresponding proxy response sections 101, 102 to 10N transmit responses to the controller 4 instead of the failed storage devices. For example, if the storage device 812 connected to the switching section 61 receives an access request from the controller 4, the proxy response section 101 transmits a response to the controller 4 instead of the storage device 812 responding.

Figure 2:
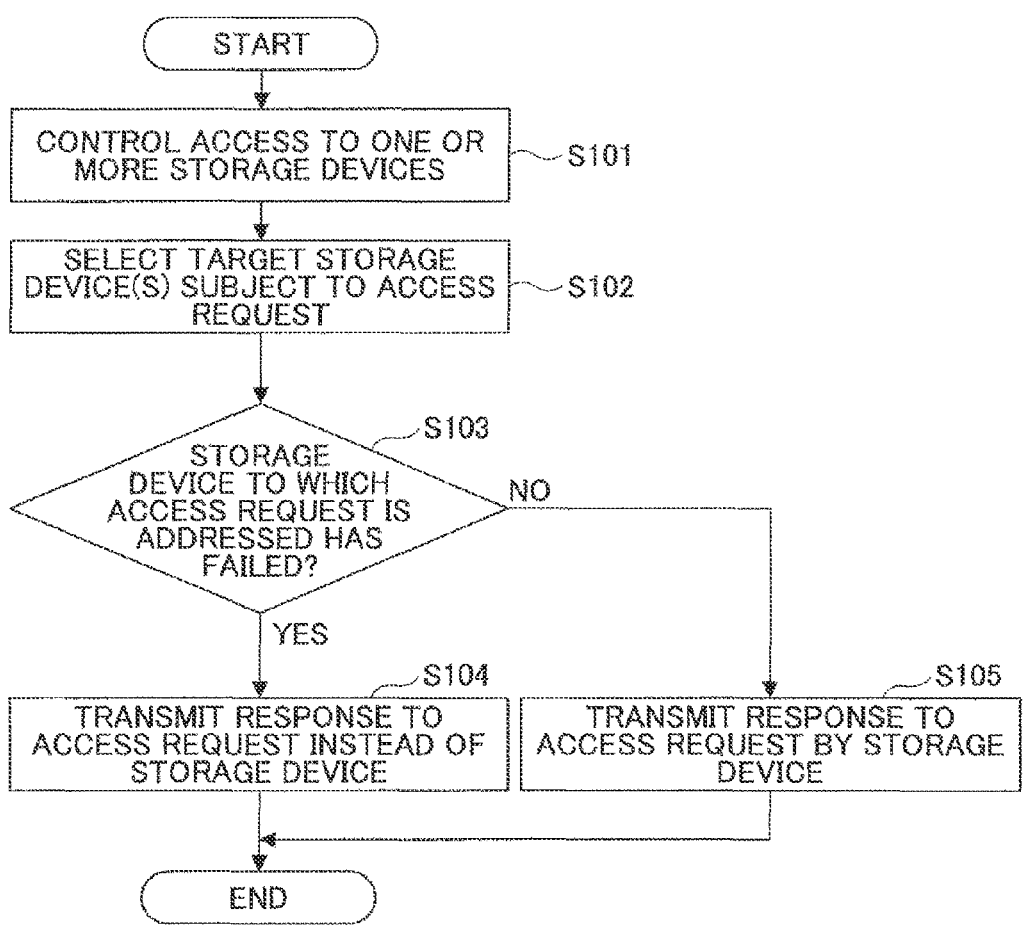
FIG. 2 is a flowchart illustrating an example of a process carried out in the storage system according to the first embodiment.

Next, a proxy response process is described with reference to FIG. 2. FIG. 2 illustrates an example of the process including a proxy response process.

The process is an example of a method for controlling the storage system according to the first embodiment or a recording medium including a computer program that implements such a method. As illustrated in FIG. 2, the controller 4 receives an access request to one or more storage devices 811, 812 to 8NN and controls access to the corresponding storage devices 811, 812 to 8NN (step S101).

The switching sections 61, 62 to 6N receive the access request from the controller 4 and select an access target storage device to which the access request is addressed from the storage devices 811, 812 to 8NN (step S102).

The proxy response sections 101, 102 to 10N determine whether the storage device to which the access request is addressed has failed (step S103).

If the storage device to which the access request is addressed has failed ("YES" in step S103), the corresponding proxy response sections 101, 102 to 10N transmit responses to the controller 4 instead of the storage devices 811, 812 to 8NN (step S104) and the process for controlling the storage system is ended.

If the storage device to which the access request is addressed has not failed ("NO" in step S103), the corresponding storage devices 811, 812 to 8NN transmit responses to the controller 4 (step S105) and the process for controlling the storage system is ended.

The storage system or the proxy response process according to the first embodiment may provide the following advantages.

(1) If the storage devices 811, 812 to 8NN to which the access requests are addressed have failed, the corresponding proxy response sections 101, 102 to 10N transmit responses to the controller 4 instead of the storage devices 811, 812 to 8NN. Accordingly, the controller 4 may not need to wait for the response process to be carried out by the storage devices 811, 812 to 8NN, which may accelerate the response process.

(2) A recovery process or a diagnostic process may be carried out on the corresponding storage devices after or while the proxy response sections 101, 102 to 10N transmit the responses to the controller 4 instead of the storage devices 811, 812 to 8NN. This indicates that the recovery process or the diagnostic process may be carried out separately from the process carried out by the controller 4 side. Accordingly, an adverse effect due to the recovery process or the diagnostic process on the controller side 4 may be reduced.

(3) If the proxy response sections 101, 102 to 10N stores respective conditions of the storage devices 811, 812 to 8NN, the proxy response sections 101, 102 to 10N may quickly carry out processes corresponding to the conditions.

[b] Second Embodiment

Figure 3:
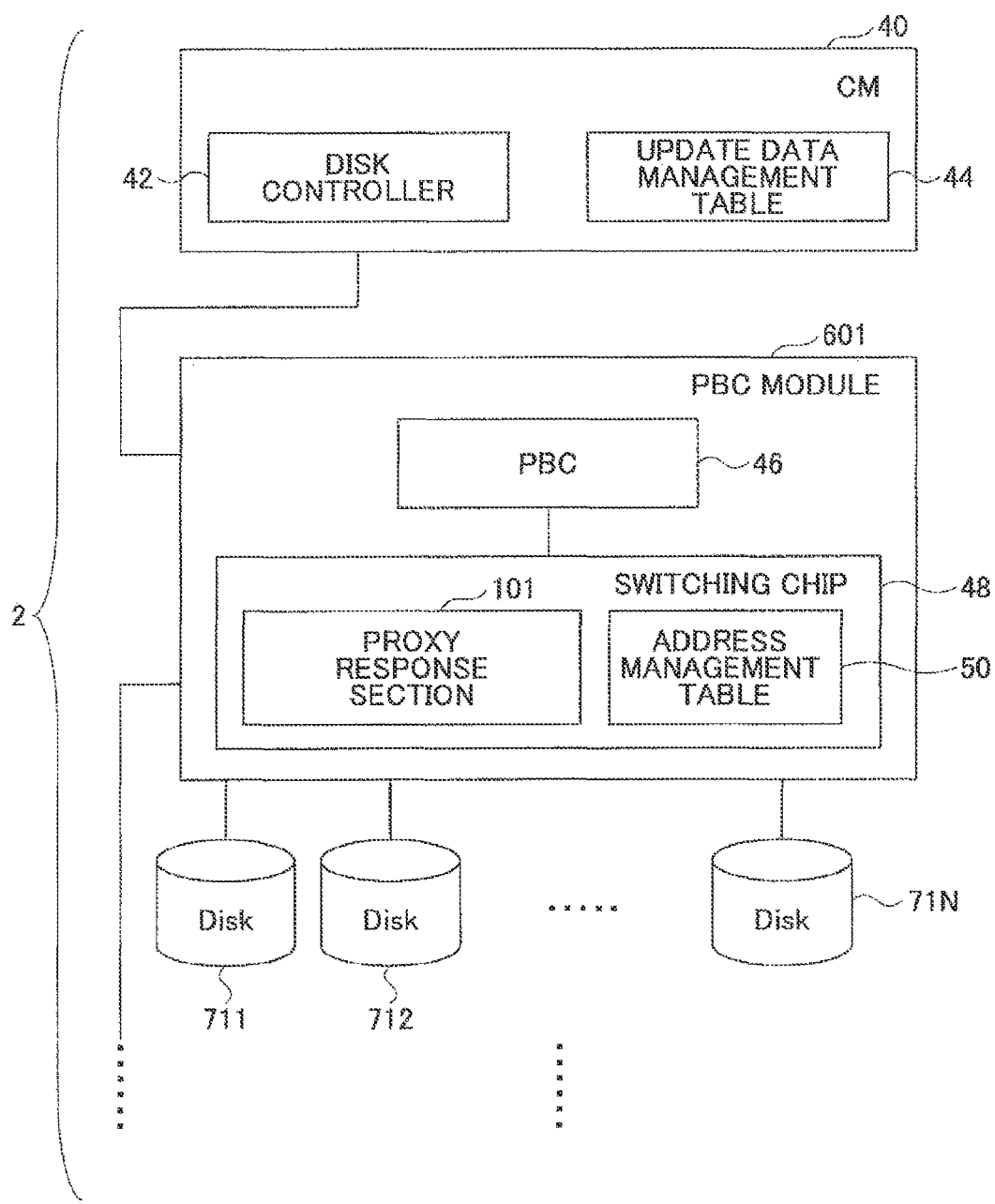
FIG. 3 is a diagram illustrating an example of a storage system according to a second embodiment.

Next, a storage system according to a second embodiment is described with reference to FIG. 3. FIG. 3 is a diagram illustrating an example of a storage system according to a second embodiment. In FIG. 3, components similar to those illustrated in FIG. 1 are provided with the same reference numerals.

FIG. 3 illustrates an example of a storage system 2 according to the second embodiment. As illustrated in FIG. 3, the storage system 2 according to the second embodiment includes a storage control module 40 (hereinafter simply called a "controller" or "CM" 40) and plural port bypass circuit (PBC) modules 601, 602 to 60N, one of which (PBC module 601) is illustrated in FIG. 3.

The CM 40 is an example of the controller 4 and configured to receive access requests from the host computer and execute I/O processes on Disks 711, 712 to 71N to which the access requests are addressed. The CM 40 includes a disk controller 42 and an update data management table 44.

The disk controller 42 is configured to control the Disks 711, 712 to 71N including the access requests such as issuing I/O instructions in response to the access requests transmitted from the host computer.

The update data management table 44 is an example of a storage information storing section configured to store storage information, namely, disk information acquired from the proxy response section 101 in the storage system 2 according to the second embodiment.

The PBC module 601 includes a PBC 46 and a switching chip 48. The PBC 46 is an example of the existing switching section 61. The PBC 46 forms a port control circuit configured to control ports via which the Disks 711, 712 to 71N are accessed and also a selecting part configured to select one or more target Disks to which the access requests are addressed from the Disks 711, 712 to 71N.

The switching chip 48 includes the existing proxy response section 101 and the address management table 50.

The proxy response section 101 in FIG. 3 corresponds to the proxy response section 101 in FIG. 1; however, the proxy response section 101 in the second embodiment (in FIG. 3) is configured to carry out, if the Disk has failed (e.g., if the diagnostic process is performed on the Disk that has received the access request), a command response process instead of the Disk that has failed or undergoes the diagnostic process so that the Disk may not transmit a response. The proxy response section 101 determines whether proxy response section 101 may need transmitting a response to the received command based on the corresponding Disk condition information stored in the address management table 50 and transmits a report indicating the condition information of the Disk to the CM 40 as a result.

The address management table 50 is an example of a condition information storage section configured to store information on conditions of the Disks 711, 712 to 71N. The address management table 50 is a management part configured to store and manage information on addresses and access destinations of the Disks 711, 712 to 71N that are devices determined in Loop initialization as routing information. The address management table 50 stores information on the conditions (or condition information) such as "Normal" of the disks corresponding to the addresses. The condition information is dynamic information that is updated corresponding to the condition of the Disk.

The Disks 711, 712 to 71N are examples of the existing storage devices 811, 812 to 8NN that are not limited to a recording medium but include a storage device such as a magnetic disk device and a MO (magneto-optical disk) device or a disk drive. The disk drive is a device for recording information in the recording medium such as a disk.

Figure 4:
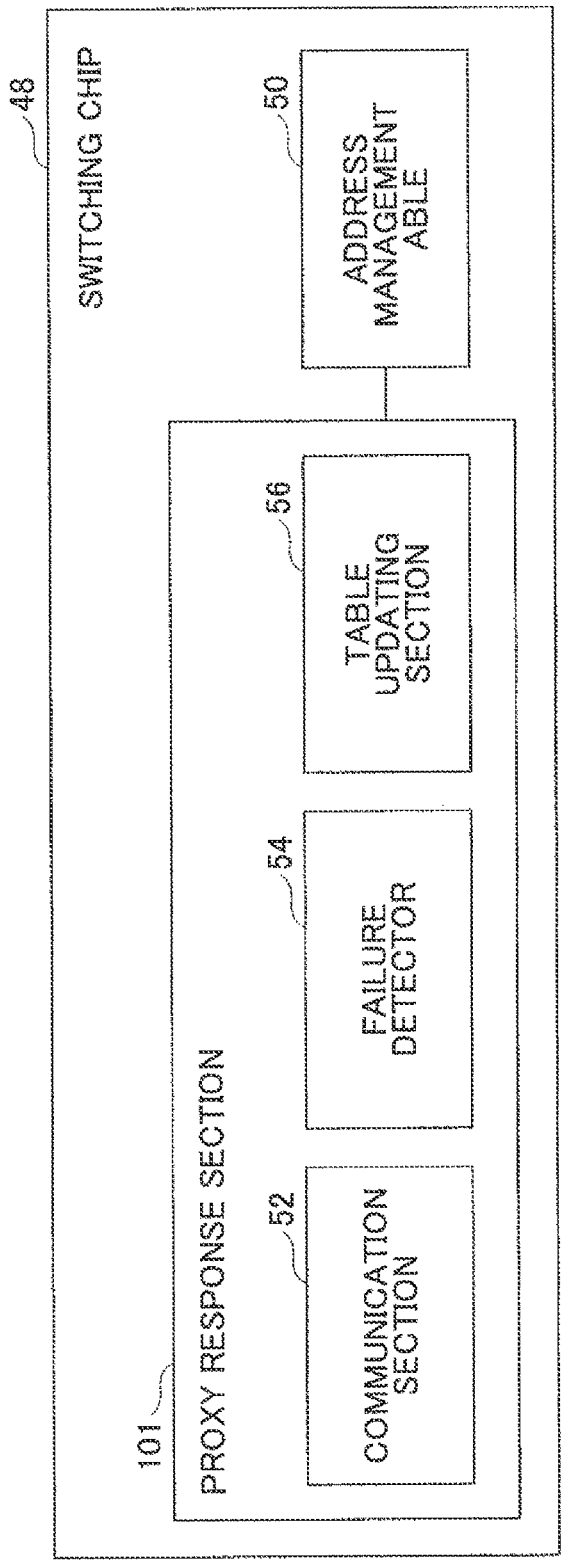
FIG. 4 is a diagram illustrating an example of a proxy response section.

Next, the proxy response section 101 is described with reference to FIG. 4. FIG. 4 illustrates an example of proxy response section 101. In FIG. 4, components similar to those illustrated in FIG. 3 are provided with the same reference numerals.

The proxy response section 101 is an example of a response part alternative to the Disk (e.g., Disk 711). The proxy response section 101 or the like is configured to transmit a response to the access request received from the CM 40 instead of the corresponding Disks 711, 712 to 71N if the Disks 711, 712 to 71N have failed. Specifically, the proxy response section 101 or the like receives I/O instruction to the corresponding Disks 711, 712 to 71N from the CM 40 and transmits the condition information stored in the address management table 50 as a response to the received I/O instruction instead of the Disks 711, 712 to 71N.

The proxy response section 101 or the like resides in the switching chip 48 of the PBC module 601. The proxy response section 101 includes, as illustrated in FIG. 4, a communication section 52, a failure detector 54, and a table updating section 56.

The communication section 52 is a transmitter/receiver part configured to transmit information to and receive information from the PBC 46 in response to the access request from the CM 40.

The failure detector 54 is an example of a detector configured to detect a failure having occurred in the Disks 711, 712 to 71N or acquire failure information from the Disks 711, 712 to 71N.

The table updating section 56 is an example of an information updating part configured to update the condition information stored in the address management table 50 based on the detected information detected by the failure detector 54. The table updating section 56 is also configured to write information.

Figure 5:
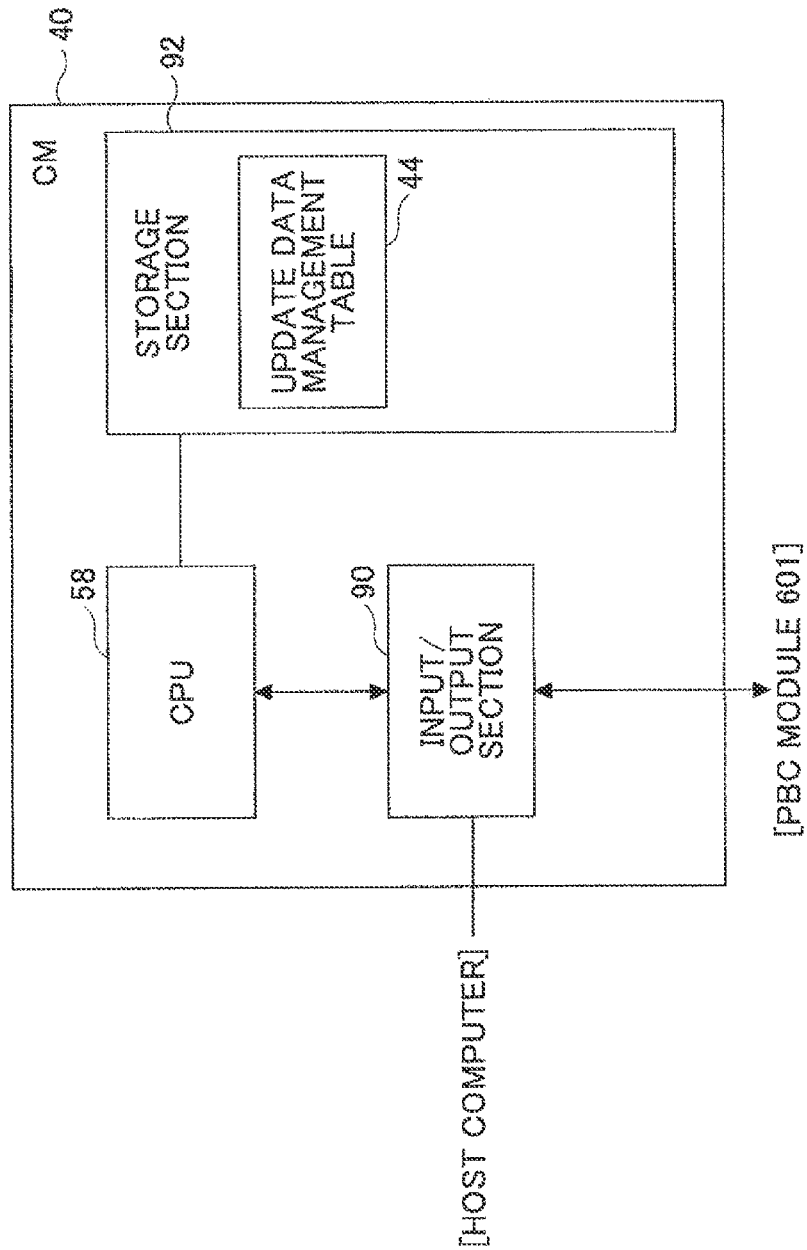
FIG. 5 is a diagram illustrating an example of a hardware configuration of a control module.

Next, the CM 40 is described with reference to FIG. 5. FIG. 5 is a diagram illustrating an example of a hardware configuration of the CM 40.

The CM 40 implements various functions such as transmitting data to the not-illustrated host computer and receiving data from the host computer, accessing the proxy response section 101 or the like, matching stored information, and managing storage information. The CM 40 includes, for example, a central processing unit (CPU) 58, an input/output section 90, and a storage section 92 as the hardware to implement the above functions.

The CPU 58 is a program executing part residing in the storage section 92 and configured to execute a control program to implement the following processes.

(a) The CPU 58 receives an access request from the host computer and issues an I/O instruction to the corresponding Disk to which the access request is addressed.

(b) The CPU 58 issues a command to the proxy response section 101 or the like at a predetermined time interval or at random to ensure the condition information of the Disks (i.e., existing storage device condition information) via the proxy response section 101 and stores the ensured condition information of the Disks in the storage section 92.

(c) The CPU 58 executes the matching process on the condition information of the Disks if the existing Disks 711, 712 to 71N (i.e., storage devices) form a RAID configuration where one of the existing Disks 711, 712 to 71N stores shared information with another one of the different Disks 711, 712 to 71N. That is, if any of the two or more Disks 711, 712 to 71N that store shared information have a mismatch in the shared information, the CPU 58 executes the matching process on the shared information.

The input/output section 90 is an example of an input/output part configured to input and output data via the control of the CPU 58. The input/output section 90 is connected to the host computer or the PBC module 601 via a bus to communicate data between the input/output section 90, the host computer, and/or the PBC module 601.

The storage section 92 stores an Operating System (OS) for executing the existing control program and the existing control program, and includes a data storage section (not illustrated). Note that the existing update data management table 44 is illustrated as an example of the data storage section in FIG. 5.

The update data management table 44 is an example of one of or both of a storage information storing section and a matching information storing section. The storage information indicates storage device information acquired from the proxy response section 101 or the like. The matching information indicates information utilized for matching the stored information shared between the plural Disks. That is, the matching information indicates the storage device information or address information utilized for matching the stored information if any of the two or more Disks 711, 712 to 71N that store shared information have a mismatch in the shared information, that is, if there is a mismatch in the stored information shared between the Disks.

Figure 6:
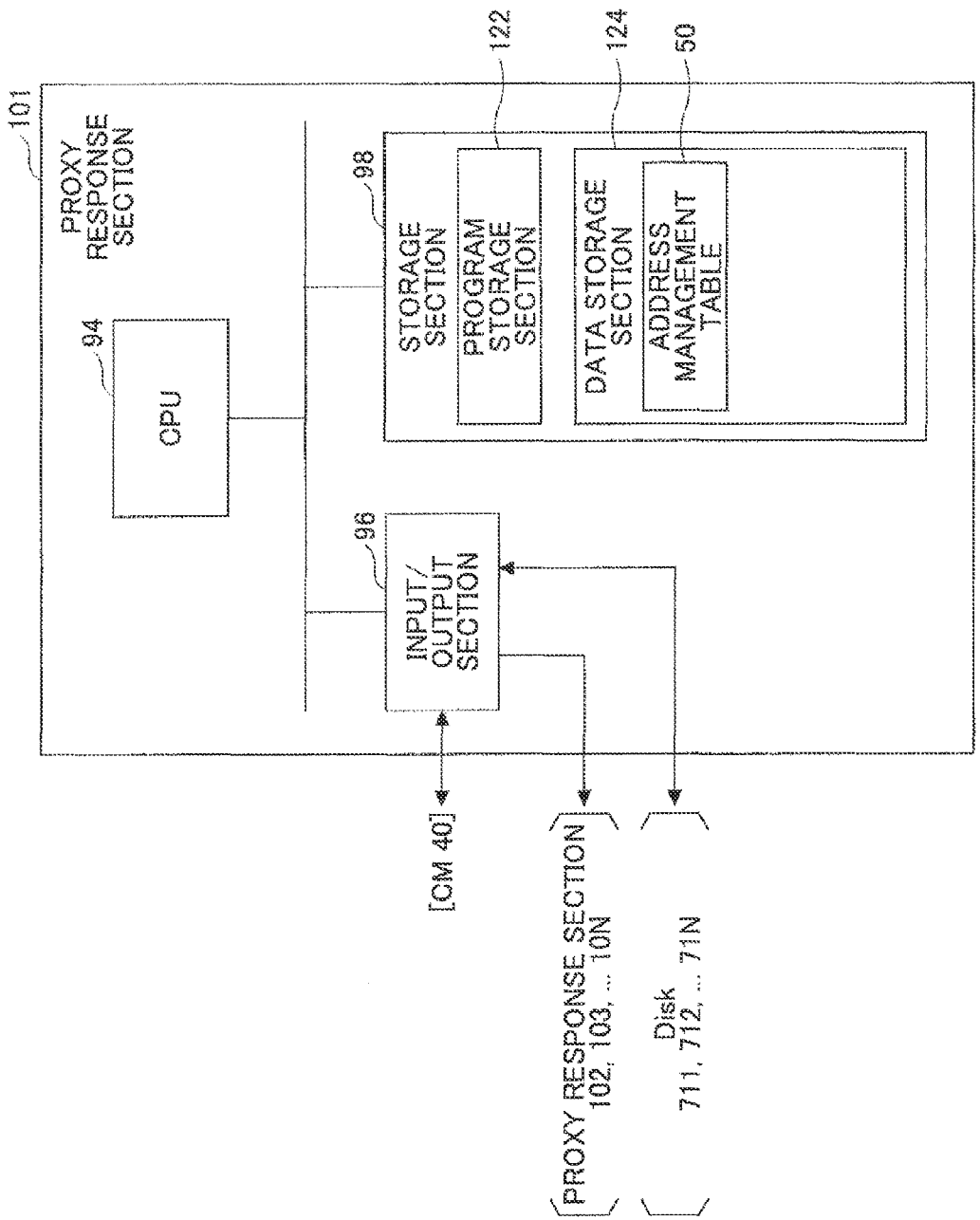
FIG. 6 is a diagram illustrating an example of a hardware configuration of the proxy response section.

Next, the proxy response section 101 is described with reference to FIG. 6. FIG. 6 is a diagram illustrating an example of a hardware configuration of the proxy response section 101.

The proxy response section 101 and the like implement, as described above, the proxy response functions instead of the Disks 711, 712 to 71N, failure detector functions of the Disks 711, 712 to 71N, and the updating function of the address management table 50. The proxy response section 101 and the like include, for example, a CPU 94, an input/output section 96, and a storage section 98 as the hardware to implement the above functions.

The CPU 94 is a program executing part residing in the proxy response section 101 and configured to execute a control program stored in the storage section 98 to implement the following processes.

(a) The CPU 94 receives an access request.

(b) The CPU 94 receives the command from the CM 40 at a predetermined time interval or at random to ensure Disk condition information (i.e., the storage device condition information) and transmits the ensured Disk condition information to CM 40.

(c) The CPU 94 detects a failure having occurred in any of the existing Disks 711, 712 to 71N utilized as the storage devices. The CPU 94 also stores (writes) the detected Disk condition information in the storage section 98.

The input/output section 96 is an example of an input/output part configured to input and output data via the control of the CPU 94. The input/output section 96 is connected to other proxy response sections 102, 103 to 10N and the Disks 711, 712 to 71N via a bus to communicate data between the input/output section 96, the proxy response sections 102, 103 to 10N and the Disks 711, 712 to 71N.

The storage section 98 is a storage part to store programs or data and formed of a recording medium such as a magnetic disk device or a semiconductor memory. The storage section 98 includes a program storage section 122 and a data storage section 124. The program storage section 122 is configured to store various programs such as the OS, the control program, and a proxy response process program.

The data storage section 124 is an example of a data storage and management part configured to store and manage condition information such as condition information of the existing storage devices. The data storage section 124 stores the existing address management table 50. The address management table 50 stores the condition information of the Disks 711, 712 to 71N in addition to the addresses and access destination information of the Disks 711, 712 to 71N.

Next, the address management table 50 is described with reference to FIGS. 7A and 7B. FIGS. 7A and 7B illustrate an example of the address management table 50.

The address management table 50 includes the addressees of the Disks determined in loop initialization as information utilized for a routing process, which is an example of the process carried out in response to the access request from the existing CM 40, and the access destination information and the condition information of the Disks. As illustrated in FIG. 7A, the address management table 50 includes an address section 126, an access destination port section 128 and a condition information section 130 in which corresponding information is stored. Compared to a later-described comparative example of an address management table 50, the address management table 50 additionally includes the condition information section 130.

The address section 126 includes, as described above, the device addresses of the Disks determined in the loop initialization. Examples of the address information stored in the address section 126 include "0x01", "0x02", "0x03" to "0xEF" as illustrated in FIG. 7A. The access destination port section 128 stores port numbers of the Disks as the access destination information. The condition information 130 stores a "Normal" condition when the Disks are in a normal condition or a "Recovering" condition when the Disks have failed and are under a recovery process. In the address management table 50 illustrated in FIG. 7A, the Disks having the addresses "0x01", "0x02", and "0x03" exhibit the "Normal" condition, whereas the Disk having the address "0xEF" exhibits the "Recovering" condition.

Further, if there is a Disk that does not recover and is not continuously used after the recovery process, the address management table 50 may store a "Broken" condition in the condition information section 130. In the address management table 50 illustrated in FIG. 7B, the Disks having the addresses "0x01", "0x02", and "0xEF" exhibit the "Normal" condition, whereas the Disk having the address "0x03" exhibits the "Broken" condition.

Next, the update data management table 44 is described with reference to FIG. 8. FIG. 8 illustrates an example of a data structure of the update data management table 44.

The update data management table 44 is an example of an address information recording part configured to record address information of the Disks that are under the recovery process in the RAID to which a data updating process (write process) is carried out. In the write process, the update data management table 44 updates the data stored in the Disks that are under the recovery process and the address data of the Disks recorded in the update data management table 44 indicate "data matching collapsed=no data redundancy".

In the matching process carried out after the successful recovery of the Disks, the data of the Disks under the recovery process are updated based on the information recorded in the update data management table 44 such that the data matching in the RAID are recovered and the data redundancy in the RAID are restored. The recovery process of the Disks includes updating the data of the Disks and recovering the data matching in the RAID.

The update data management table 44 records information to specify the addresses and data of the Disks that may need updating in the matching process. If the Disks form the normal RAID configuration, stripe numbers and the like may be used as the addresses of the Disks.

As illustrated in FIG. 8, the address management table 44 includes a data update desired Disk section 132 and a data update desired address section 134 in which corresponding information is stored. The data update desired Disk section 132 stores information on the Disks that may need data updating (i.e., data update desired Disk information). In the second embodiment, Disk 1, Disk 1, Disk 2 . . . are stored as the data update desired Disk information. The data update desired address section 134 stores the addresses of the Disks that may require data updating. In this example, Disk 1 and Disk 2 may need data updating and a "stripe 1" for the Disk 1 and a "stripe 2" for the Disk 2 are recorded as the addresses of the Disks that may need data updating.

Next, a proxy response operation carried out by the PBC module 601 is described with reference to FIGS. 9 to 12. FIGS. 9 to 12 illustrate examples of the proxy response operation carried out by the PBC module 601. In FIGS. 9 to 12, components similar to those illustrated in FIG. 3 are provided with the same reference numerals.

Figure 9:
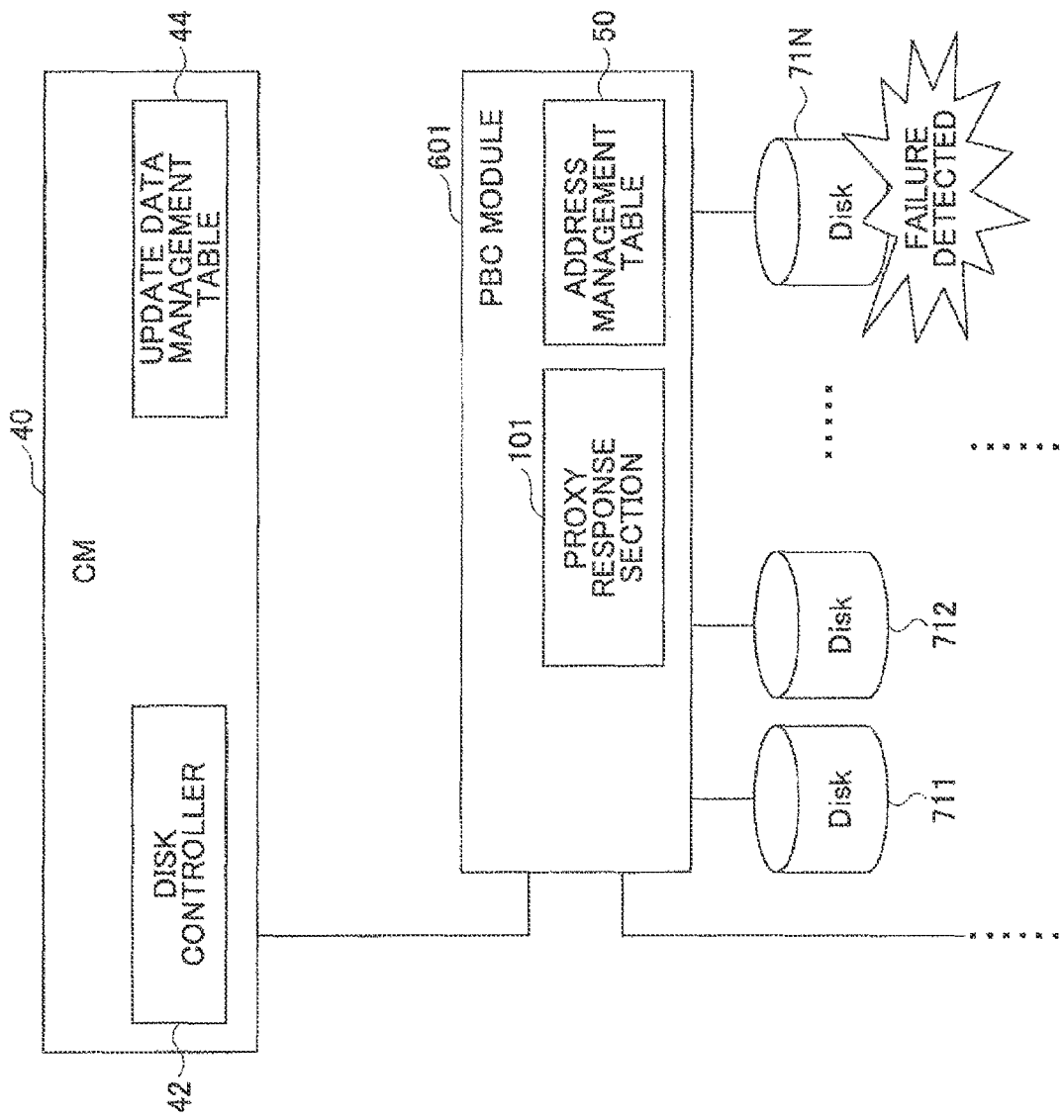
FIG. 9 is a diagram illustrating an example of a proxy response operation.

FIG. 9 illustrates a case where a specific failure has occurred in the Disk 71N connected to the PBC module 601, which is one of the PBC modules, and the failure of the Disk 71N has just been detected. When such failure of the Disk 71N has been detected, the target Disk 71N having the failure is disconnected from the loop. The proxy response section 101 stores the condition of the Disk 71N in the address management table 50.

Figure 10:
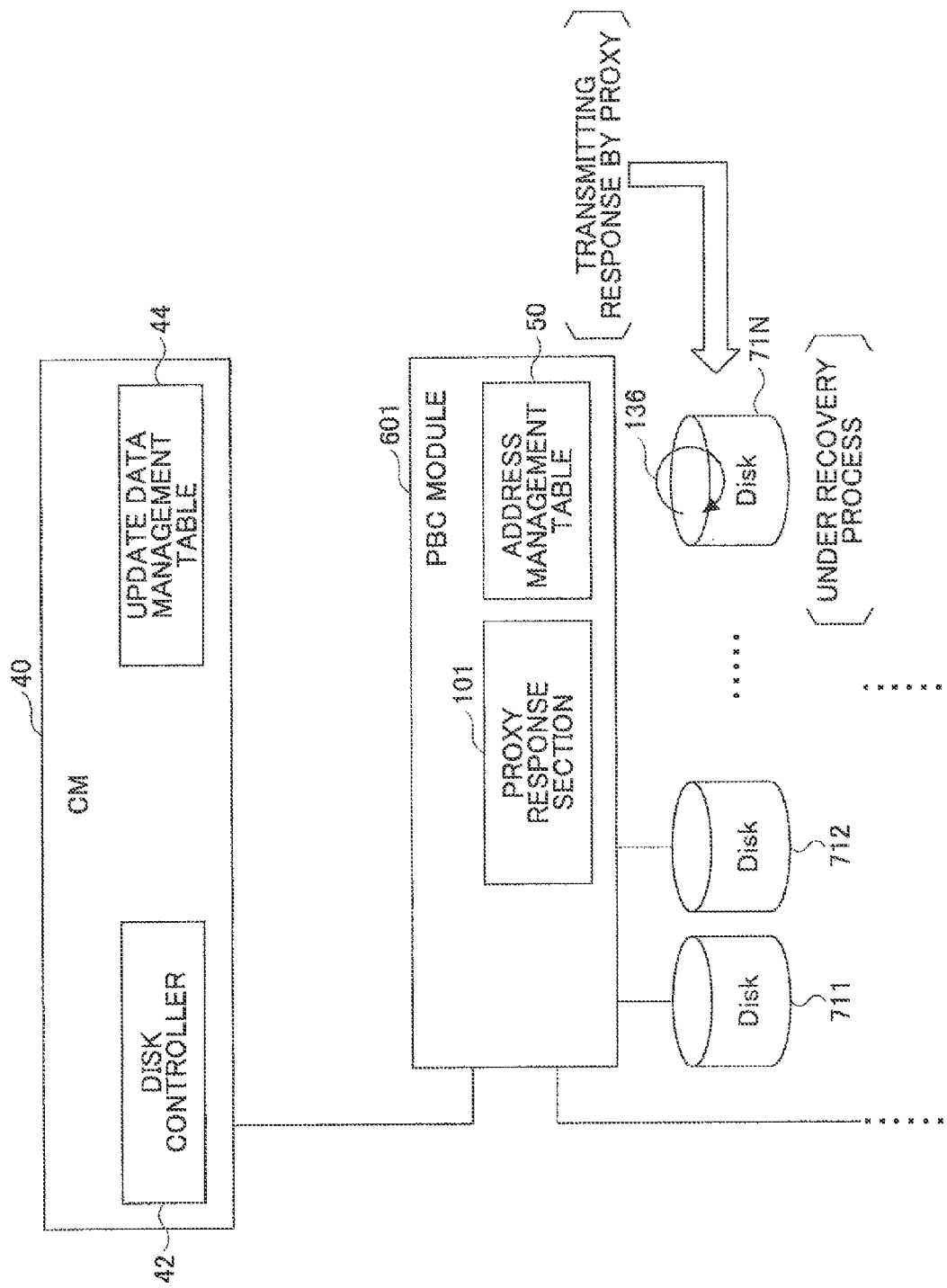
FIG. 10 is a diagram illustrating another example of the proxy response operation.

As illustrated in FIG. 10, in the Disk 71N, the process to be carried out moves to a recovery process 136 such that the Disk 71N undergoes the recovery process 136 (i.e., a recovery process condition). In this case, the proxy response section 101 records the condition of the Disk 71N as the "Recovering" condition together with the address and the access destination port number of the Disk 71N in the address management table 50. Then, the proxy response section 101 is switched to a proxy response mode to transmit a response by proxy instead of the Disk 71N.

Figure 11:
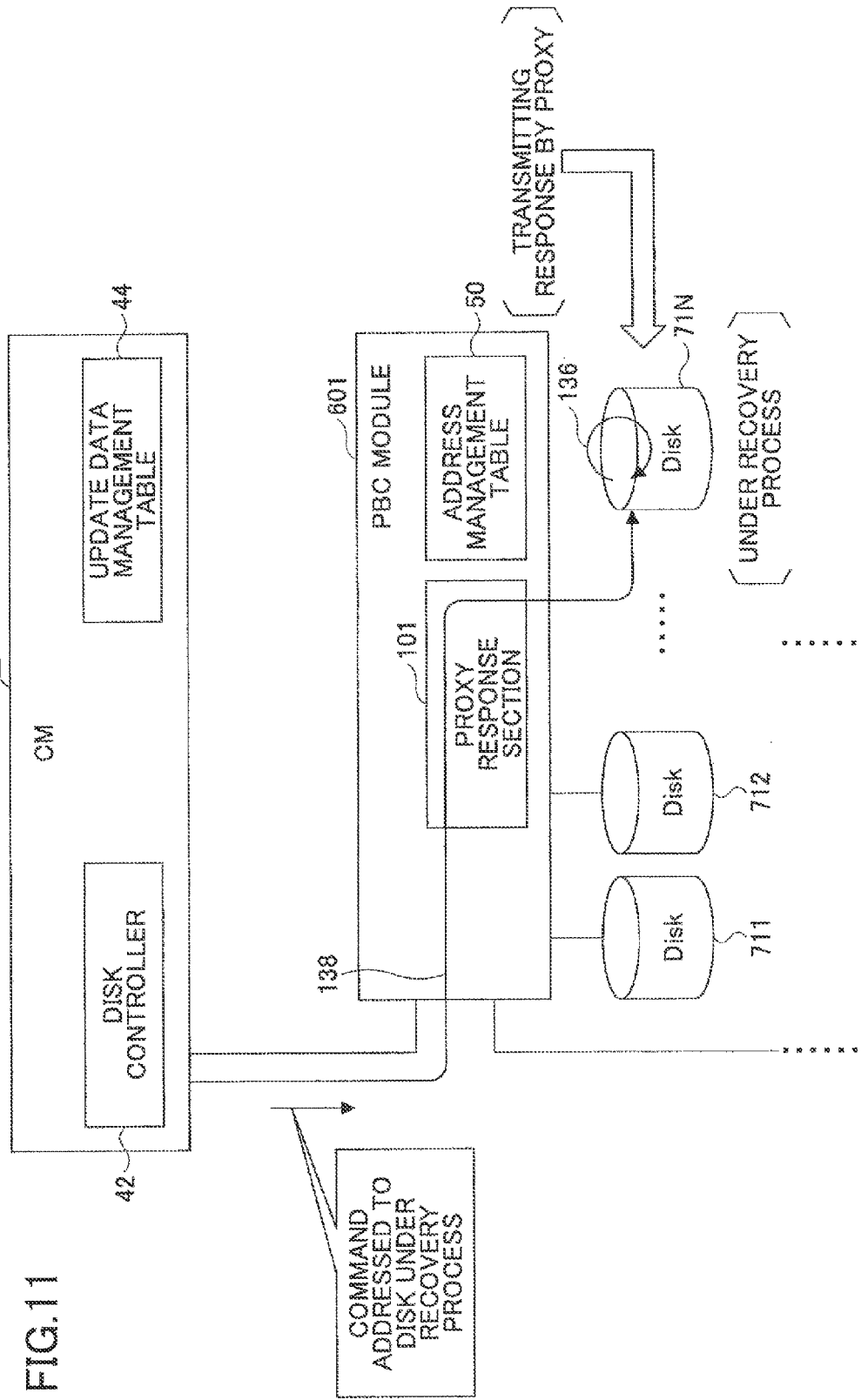
FIG. 11 is a diagram illustrating another example of the proxy response operation.

As illustrated in FIG. 11, if a command 138 is issued from the CM 40 to the Disk 71N that is under the recovery process, the corresponding proxy response section 101 (i.e., the proxy response section in charge of Disk 71N) receives the command issued from the CM 40 instead of the Disk 71N. The Disk 71N continuously undergoes the recovery process while the proxy response section 101 receives the command instead. The proxy response section 101 then transmits a response by proxy in response to the access request from the CM 40 instead of the Disk 71N.

Figure 12:
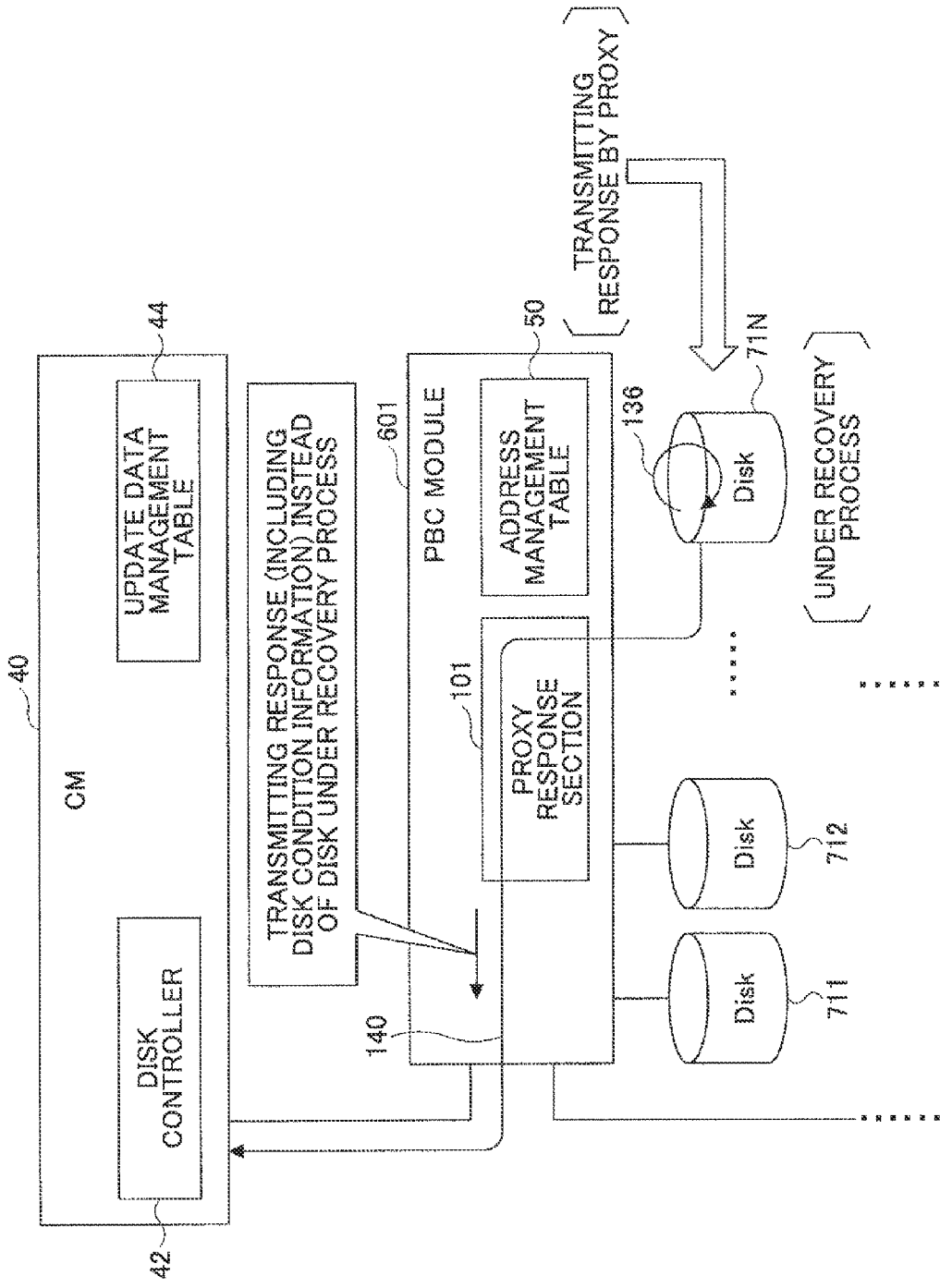
FIG. 12 is a diagram illustrating another example of the proxy response operation.

As illustrated in FIG. 12, in the proxy response operation, the proxy response section 101 carries out a proxy response 140 instead of the Disk 71N that is under the recovery process. The proxy response 140 contains information indicating that the proxy response 140 is a response transmitted from the proxy response section 101 instead of the Disk 71N and the Disk 71N is currently in the "Recovering" condition as the condition information of the Disk 71N.

Figure 13:
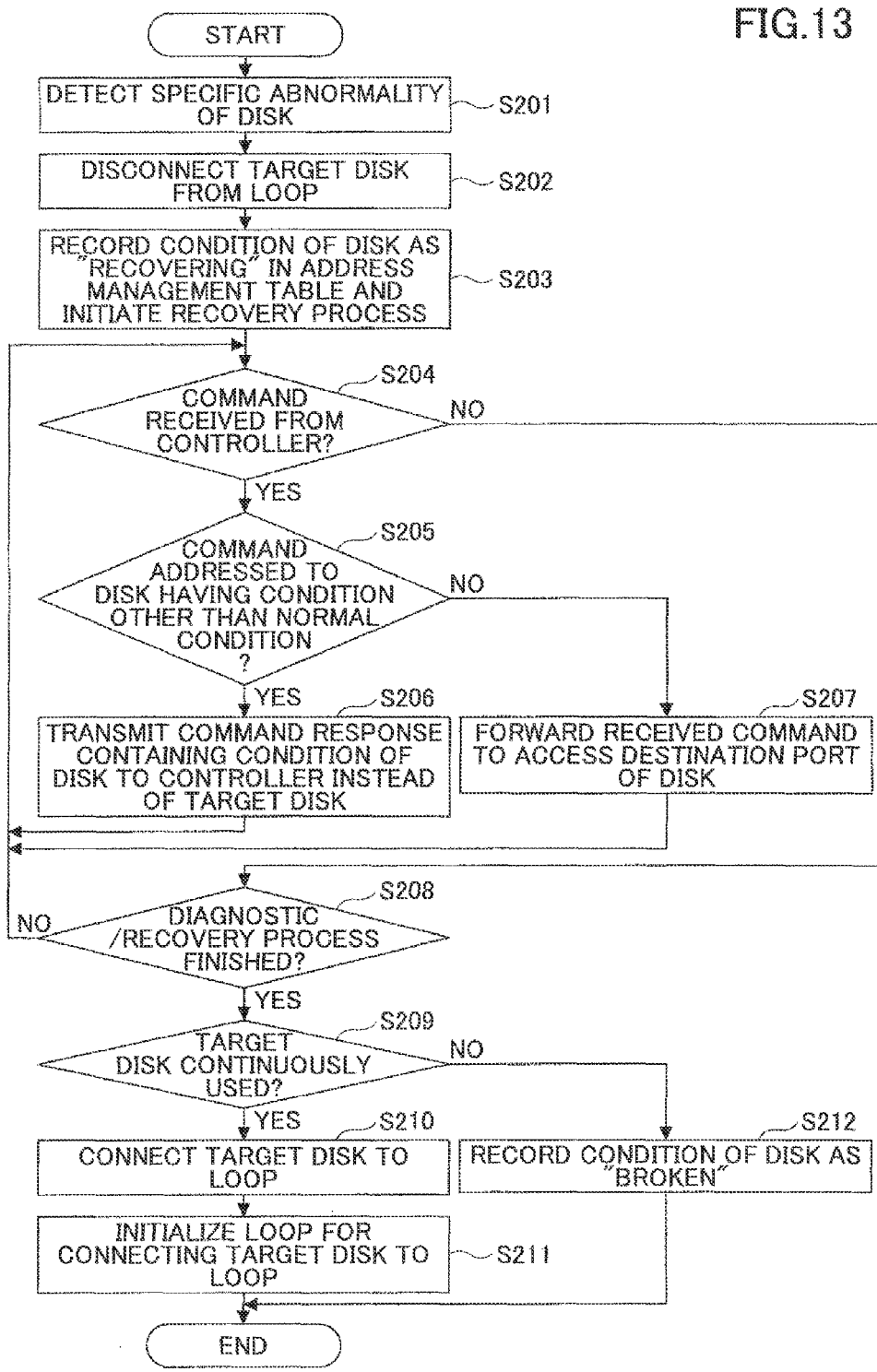
FIG. 13 is a flowchart illustrating an example of a disk recovery operation.

Next, the Disk recovery operation is described with reference to FIG. 13. FIG. 13 illustrates an example of the Disk recovery operation carried out by the PBC module.

The Disk recovery operation carried out by the PBC module is an example of a method for controlling the storage system, which illustrates an outline of the operation carried out by the PBC module. As illustrated in FIG. 13, in the Disk recovery process, a specific abnormality of the Disk (target Disk) is detected (step S201) and the target Disk is disconnected from the loop (step S202). The condition of the target Disk is then recorded as the "recovering" condition (see FIG. 7A) and the Disk recovery process is initiated (step S203).

Subsequently, whether the command has been transmitted from the controller 4 is determined (step S204). If the command from the controller has been received ("YES" in step S204), whether the command is addressed to the target Disk having the condition other than the "Normal" condition is subsequently determined (step S205).

If the command is addressed to the target Disk having the condition other than the "Normal" condition ("YES" in step S205), the proxy response section 101 transmits a command response containing the condition of the target Disk to the controller 4 instead of the target Disk (step S206) and returns to carrying out the process in step S204.

If the command is not address to the target Disk having the condition other than the "Normal" condition ("NO" in step S205), the proxy response section 101 forwards the received command to the access destination port of the target Disk (step S207) and returns to the process in step S204.

If the command from the controller 4 is not received by the proxy response section 101 ("NO" in step S204), whether the diagnostic/recovery process has been finished is subsequently determined (step S208). If the diagnostic/recovery process has not been finished ("NO" in step S208), the proxy response section 101 returns to the process in step S204 and then carries out the processes in step S204 to S208.

If the diagnostic/recovery process has been finished ("YES" in step S208), whether it is possible to continuously use the target Disk that has completed the diagnostic/recovery process is subsequently determined (step S209).

If it is possible to use the target Disk that has completed the diagnostic/recovery process ("YES" in step S209), the target Disk is connected to the loop (step S210) and the loop is initialized for connecting the target Disk to the loop (step S211), thereby ending the process.

If, on the other hand, it is not possible to use the target Disk that has completed the diagnostic/recovery process ("NO" in step S209), the condition of the target Disk is recorded as the "Broken" condition (see FIG. 7B) in the address management table 50 (step S212) and the process is ended.

Next, operations carried out by the CM 40 and the PBC module 601 are described.

The CM 40 determines whether the response to the command addressed to the Disk is transmitted from the Disk or the proxy response section. The result determined by the CM 40 may contain identifier information indicating that the response to the command (command response) is transmitted by the proxy response section 101 if the CM 40 determines that the response to the command addressed to the Disk is transmitted from the proxy response section 101 (this process is similar to later described processes carried out by the proxy response section 102 to 10N). If the CM 40 determines that the response to the command is from the proxy response section 101, the CM 40 executes an identifying process to identify the condition information of the Disk contained in the command. The CM 40 subsequently determines a subsequent operation based on the condition of the Disk, that is, "Recovering" or "Broken" identified in the identifying operation.

If the condition of the Disk is "Broken", the CM 40 records the condition of the Disk as the broken condition and carries out a process desired for the broken condition. If the condition of the Disk is "Recovering", the CM 40 carries out the following processes to issue the I/O instructions while the Disk is under the recovery process or to determine that the recovery process is finished until the recovery process of the Disk is finished; that is, until the CM 40 is able to determine that the recovery process of the Disk is finished.

(1) If data stored in a region of the Disk need to be read and the data are made redundant by the RAID configuration, the data may be retrieved from the redundant Disk(s) excluding the target Disk.

(2) If data need to be written in a region of the Disk and the data are made redundant by the RAID configuration, the data may be written in the redundant Disk(s) excluding the target Disk. The CM 40 maintains the address recorded in the RAID configuration to which the data are written until the "Recovering" condition of the target Disk is changed. The region to which the data are written corresponds to the update data management table 44.

(3) The CM 40 issues a command at a predetermined time interval to monitor the target Disk and ensures contents of the response transmitted from the proxy response section 101 and determines the appropriate process to be carried out based on the contents of the response.

(4) The CM 40 records the condition of the Disk as the broken condition if the condition of the Disk is "Broken". In this case, the recovery process is carried out on the broken Disk.

(5) If the loop is initialized and the target Disk is connected to the initialized loop, the CM 40 determines that the target Disk has been restored and carries out the data matching process on the target Disk based on the recorded contents of the target Disk.

(6) If the loop is initialized and the target Disk is disconnected from the initialized loop, the CM 40 determines that the target Disk is under the recovery process or broken and carries out the disk failure diagnostic process on the target Disk. If the result indicates that the Disk is broken, the CM 40 deletes the condition information from the update data management table 44. If the loop is initialized again and the target Disk is connected to the loop, the data matching process is carried out on the existing data.

Figure 14:
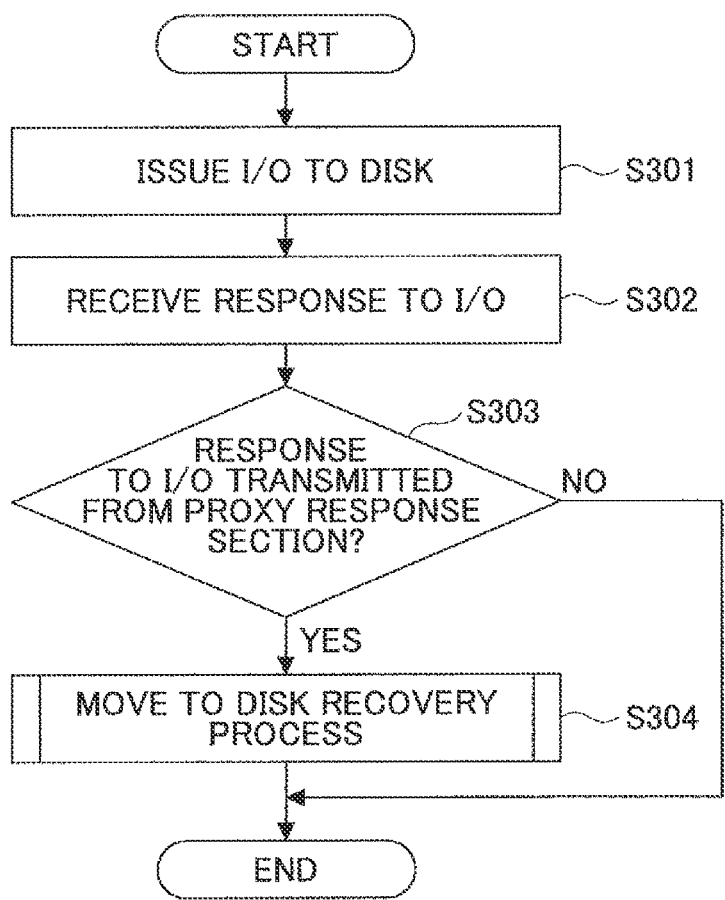
FIG. 14 is a flowchart illustrating an example of a command issuing and response transmitting process.

Next, a command issuing and response transmitting process carried out by the CM 40 is described with reference to FIG. 14. FIG. 14 illustrates an example of the command issuing and response transmitting process.

The command issuing and response transmitting process carried out by the CM 40 is an example of a method for controlling the storage system, which illustrates a determining process to determine the communication process between the CM 40 and PBC module 601 and contents of the response. As illustrated in FIG. 14, in the command issuing and response transmitting process, the CM 40 issues an I/O instruction to the Disk (step S301). The CM 40 subsequently receives a response corresponding to the I/O instruction (step S302). The CM 40 determines whether the received response is transmitted from the proxy response section 101 (step S303), and if the received response is not from the proxy response section ("NO" in step S303), the CM 40 ends the process.

Figure 15:
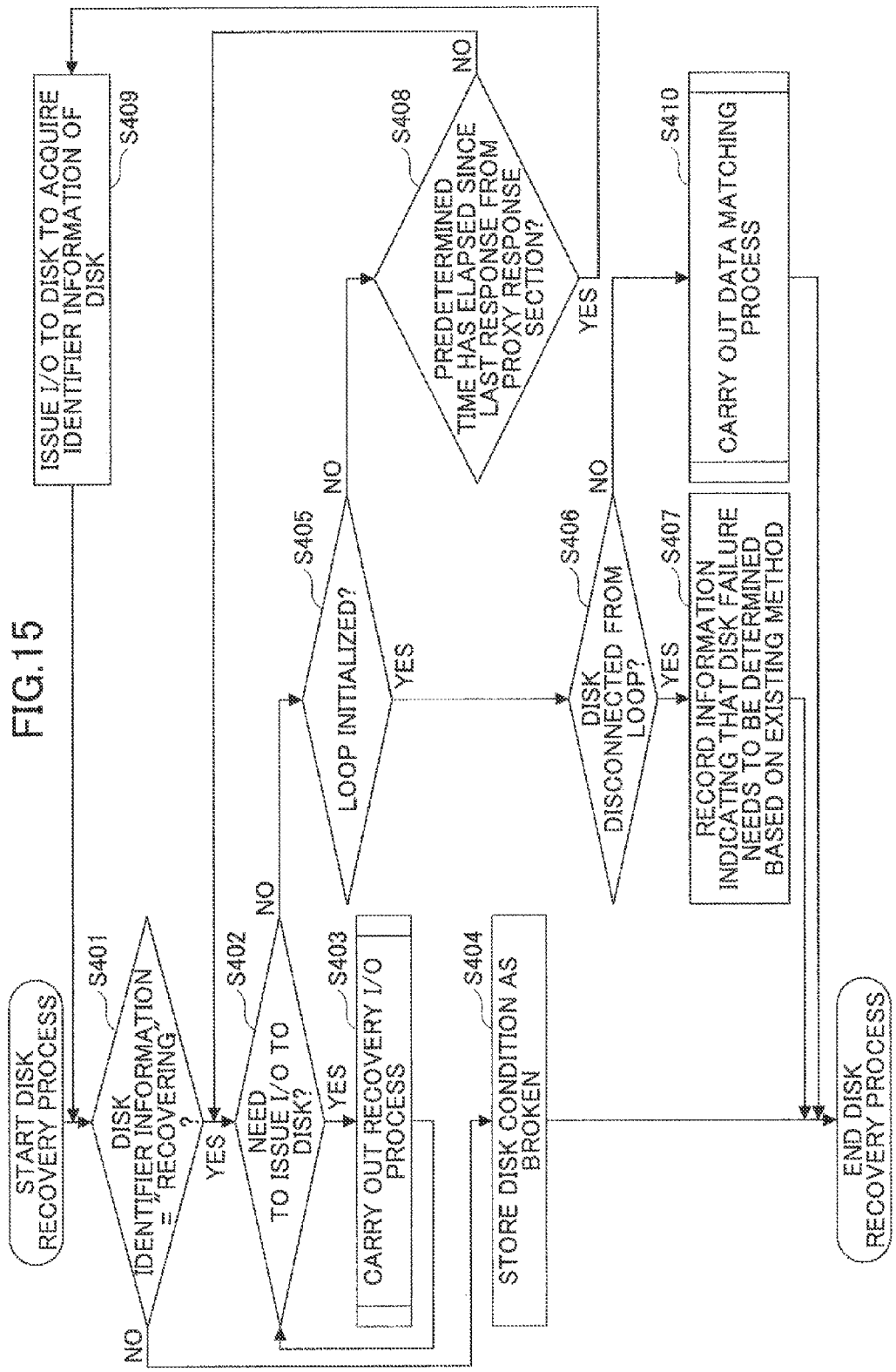
FIG. 15 is a flowchart illustrating an example of a disk recovery process.

If the received response is from the proxy response section ("YES" in step S303), the process to be carried out is moved to a Disk recovery process illustrated in FIG. 15 (step S304).

Next, the Disk recovery process is described with reference to FIG. 15. FIG. 15 illustrates an example of the Disk recovery process.

Figure 16:
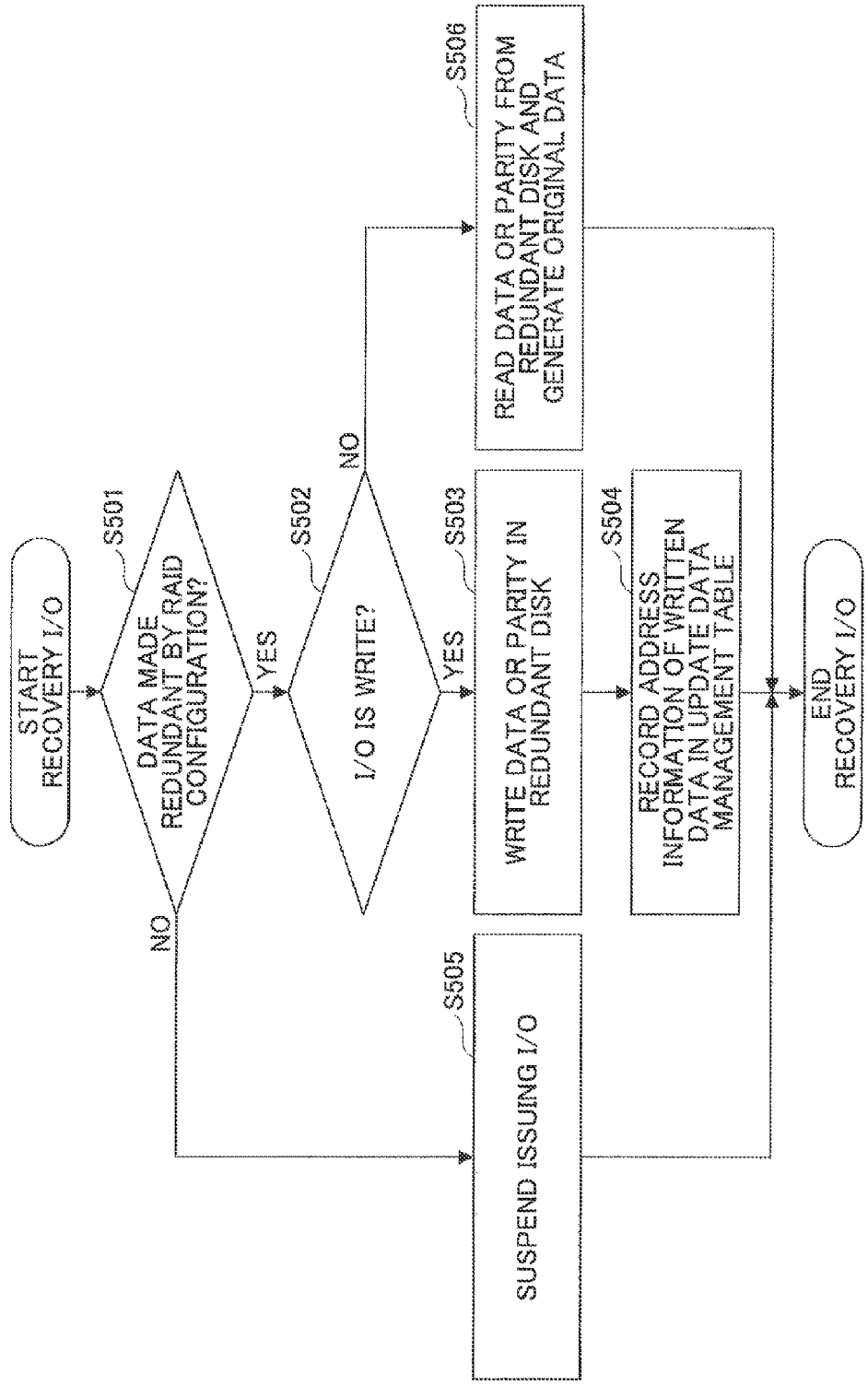
FIG. 16 is a flowchart illustrating another example of the disk recovery process.

The Disk recovery process is an example of a method for controlling the storage system, which illustrates a Disk recovery sequence. As illustrated in FIG. 15, in the Disk recovery process carried out in the CM 40, whether the identifier information of the Disk is "Recovering" is determined (step S401). If the identifier information of the Disk is "Recovering" ("YES" in step S401), whether an I/O needs to be issued is subsequently determined (step S402). If the I/O needs to be issued ("YES" in step S402), the recovery I/O process illustrated in FIG. 16 is executed (step S403) and the process to be carried out moves to the process in step S402.

If the identifier information of the Disk is not "Recovering" ("NO" in step S401), the condition of the target Disk is recorded as "Broken" (step S404). In this case, since the target Disk is broken, the Disk recovery process is ended.

If the I/O needs not to be issued to the target Disk ("NO" in step S402), whether the loop is initialized is determined (step S405).

If the loop is initialized ("YES" in step S405), whether the target Disk is disconnected from the loop is subsequently determined (step S406). If the target Disk is disconnected from the loop ("YES" in step S406), information indicating that the failure of the Disk may be determined based on the existing method is recorded (step S407) and the Disk recovery process is ended.

If the loop is not initialized ("NO" in step S405), whether a predetermined time has elapsed since the last response from the proxy response section 101 is subsequently determined (step S408). If the predetermined time has not been elapsed since the last response from the proxy response section 101 ("NO" in step S408), the process to be carried out returns to the process in step S402. If, on the other hand, the predetermined time has been elapsed since the last response from the proxy response section 101 ("YES" in step S408), the I/O for acquiring the identifier information of the Disk is issued to the target Disk (step S409) and the process to be carried out returns to the process in step S401.

Figure 17:
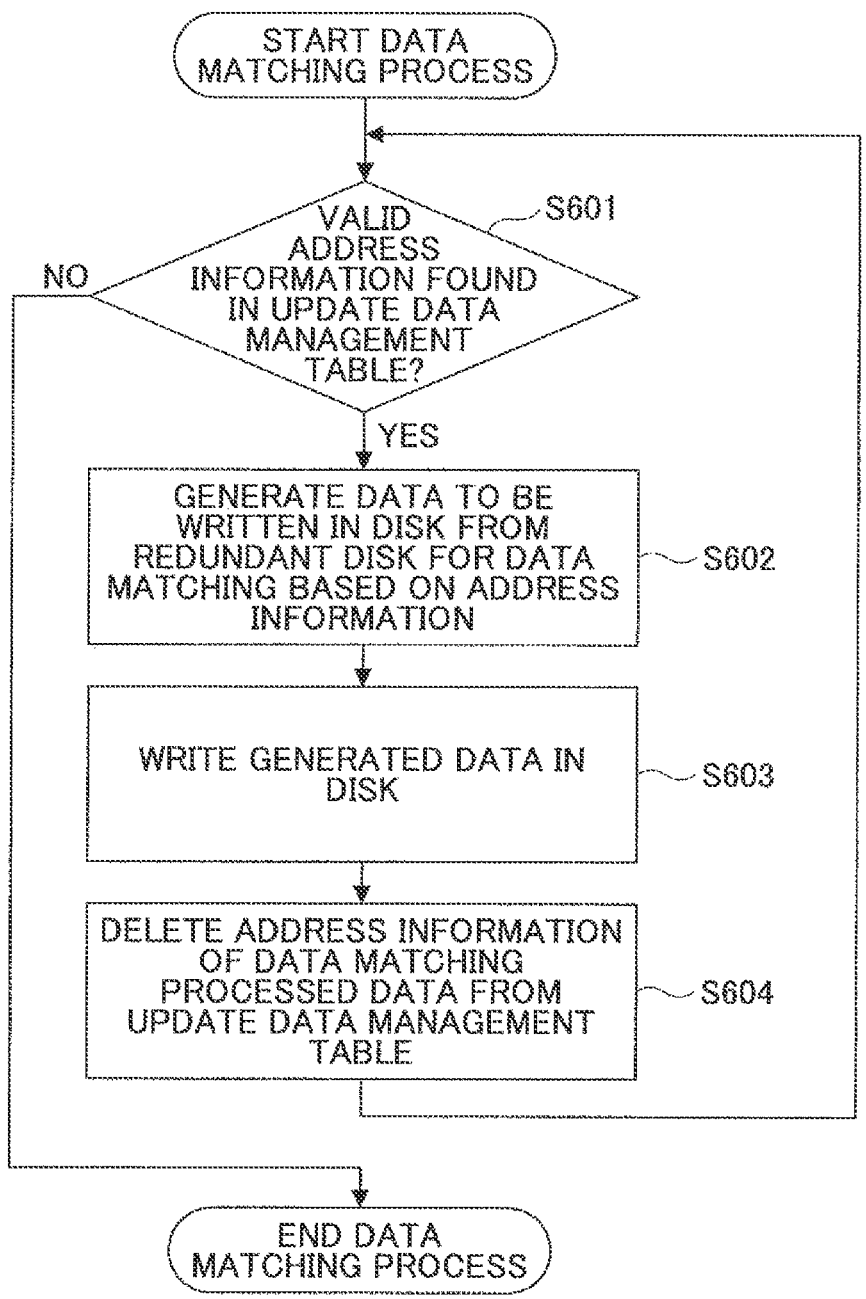
FIG. 17 is a flowchart illustrating an example of a data matching process.

If the target Disk is not disconnected from the loop ("NO" in step S406), the data matching process illustrated in FIG. 17 is executed (step S410), the Disk recovery process is ended after the execution of the data matching process, and the process to be carried out returns to the process in the existing step S304 (see FIG. 14).

Next, the Disk recovery I/O process is described with reference to FIG. 16. FIG. 16 illustrates an example of the Disk recovery I/O process.

The Disk recovery process is an example of a method for controlling the storage system, which illustrates the Disk recovery I/O process (step S403 in FIG. 15). As illustrated in FIG. 16, in the Disk recovery I/O process, whether data are made redundant by the RAID configuration is determined. If the data are made redundant by the RAID configuration ("YES" in step S501), whether the I/O is a write I/O instruction is subsequently determined (step S502). If the I/O is a write I/O instruction ("YES" in step S502), the data or parity data are written in the redundant Disk (step S503). Subsequently, the address information of the written data is recorded in the update data management table 44 (step S504), the Recovery I/O process is ended, and the process to be carried out returns to the process in step S403 (FIG. 15).

If the data are not made redundant by the RAID configuration ("NO" in step S501), the CM 40 suspends issuing I/O (step S505), ends the Recovery I/O process and returns to the process in step S403 illustrated in FIG.

If the I/O is not a write I/O instruction ("NO" in step S502), the data or parity are read from the redundant Disk, the original data are generated based on the read data or parity (step S506), the Recovery I/O process is ended and the process to be carried out returns to the process in step S403 illustrated in FIG. 15.

Next, the data matching process is described with reference to FIG. 17. FIG. 17 illustrates an example of the data matching process.

The data matching process is an example of a method for controlling the storage system, which illustrates the data matching process (step S410 in FIG. 15). As illustrated in FIG. 17, whether there is valid address information stored in the update data management table 44 is determined (step S601). If the valid address information is found in the update data management table 44 ("YES" in step S601), data to be written in the target Disk are generated from the redundant for data matching based on the address information stored in the update data management table 44 (step S602).

The generated data are then written in the target Disk (step S603), the address information of the data matching processed data is deleted from the update data management table 44 (step S604), and the process to be carried out returns to the process in step S601.

If, on the other hand, the valid address information is not found in the update data management table 44 ("NO" in step S601), the data matching process is ended, and the process to be carried out returns to the process in step S410 (see FIG. 15).

Figure 18:
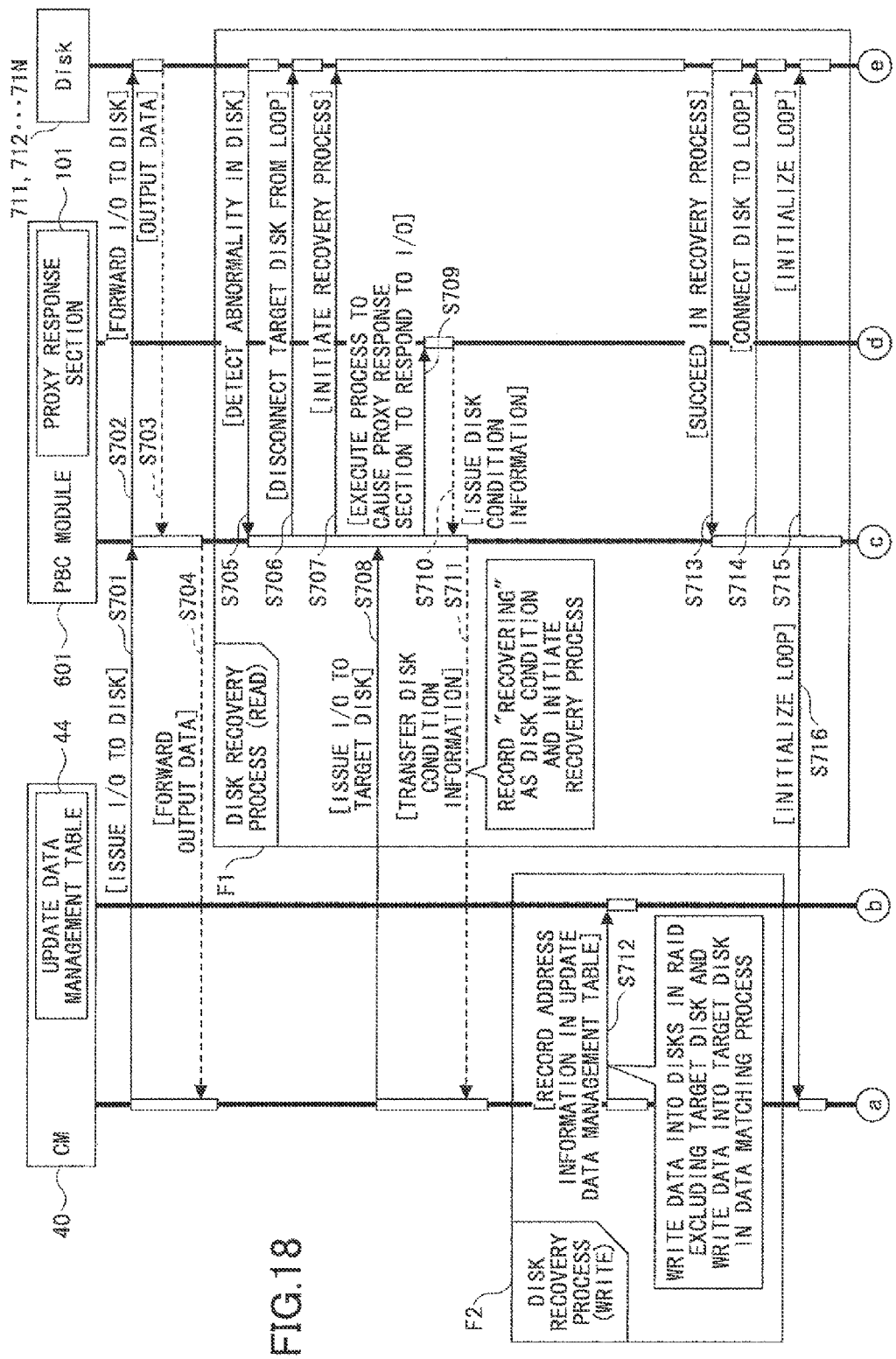
FIG. 18 is a diagram illustrating an example of a correlation between processes of respective sections when the disk recovery is successful.
Figure 19:
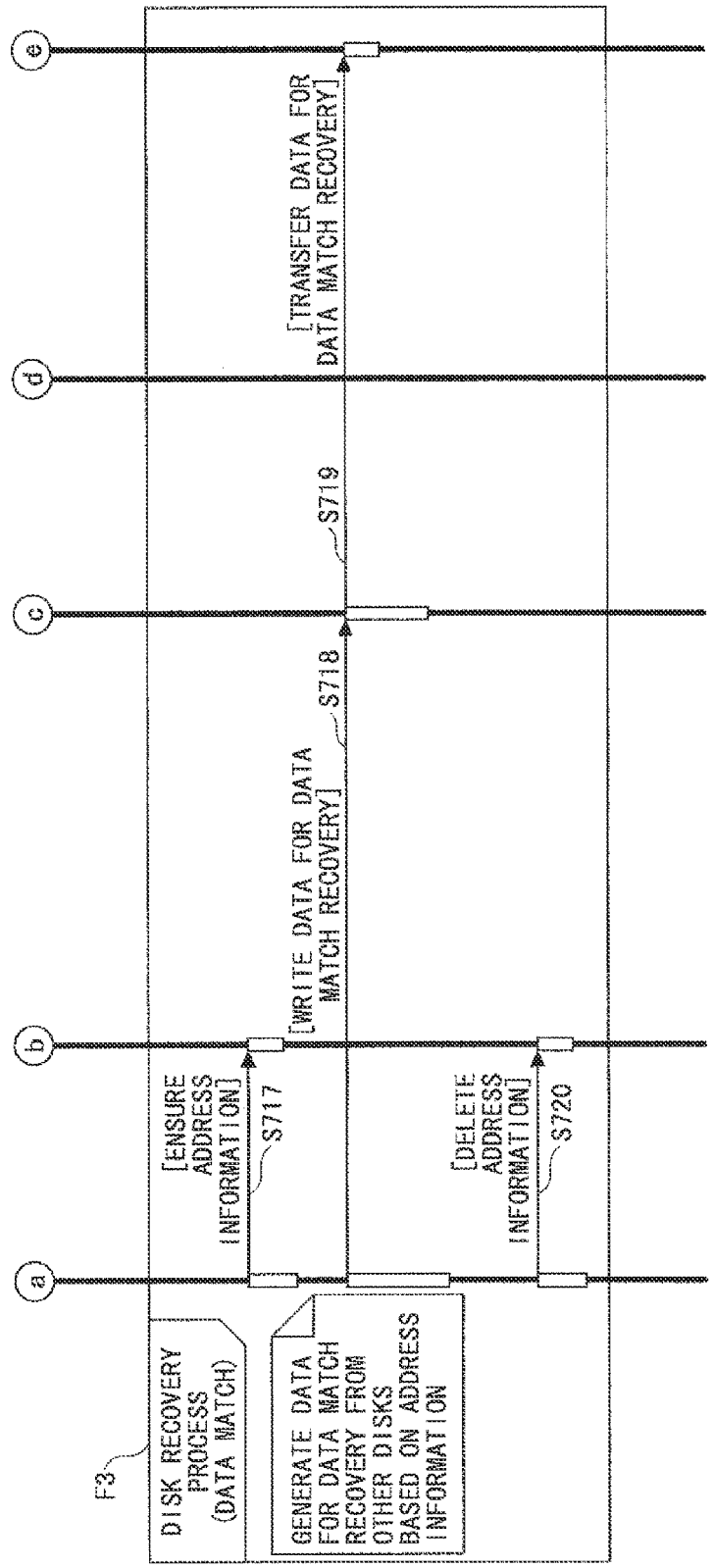
FIG. 19 is a diagram illustrating another example of the correlation between the processes of the respective sections when the disk recovery is successful.

Next, a correlation between processes of the CM 40, the PBC module 601, and the Disks 711, 712 to 71N is described with reference to FIGS. 18 and 19. FIGS. 18 and 19 each illustrate an example of the correlation between the processes illustrated in the existing flowcharts. In FIGS. 18 and 19, "a", "b", "c" and "d" represent connectors between the flowcharts.

The correlation between the processes represents an example of a method for controlling the storage system, which illustrates a case where the Disk recovery process has been successful. As illustrated in FIG. 18, the processes include a PBC module 601 conducting Disk recovery process F1, a CM 40 conducting recovery process F2, and a CM 40, PBC module 601 and Disks 711, 712 to 71N conducting data matching process F3.

As illustrated in FIG. 18, the CM 40 issues I/Os to the Disks 711, 712 to 71N (step S701). The PBC module 601 receives the issued I/Os and forwards the received I/Os to the respective Disks (step S702). The Disks that have received the issued I/Os output data to the PBC module 601 (step S703). The PBC module 601 forwards the data output from the Disks to the CM 40 (step S704).

When the PBC module 601 detects a specific abnormality in the Disk (step S705), the process to be carried out moves to the Disk recovery process F1. Subsequently, when the PBC module 601 detects the specific abnormality in the Disk (or a target Disk), the PBC module 601 disconnects the target Disk from the loop (step S706), initiate the recovery process for the target Disk (step S707) and records the condition of the target Disk as "Recovering" in the update data management table 44.

If an I/O is issued from the CM 40 to the target Disk while the target Disk undergoes the Disk recovery process, the issued I/O addressed to the target Disk is received by the PBC module 601 (step S708). The PBC module 601 then executes a process to cause the proxy response section 101 to respond to the issued I/O (step S709). In this case, since the PBC module 601 acknowledges the fact that the target Disk is unable to respond to the issued I/O, the PBC module 601 issues a command for causing the proxy response section 101 to respond to the issued I/O. On receiving the command, the proxy response section 101 issues Disk condition information (step S710), and the issued Disk condition information is then transferred from the PBC module 601 to the CM 40 (step S711). On receiving the Disk condition information, the CM 40 records the condition of the Disk as "Recovering" and initiates the Disk recovery process F2.

In the Disk recovery process F2, the address information is recorded in the update data management table 44 (step S712). In the data writing process to write data into the RAID including the Disk under the recovery process, the data are written into the Disks excluding the target Disk under the recovery process and the data writing process to write data into the target Disk having the specific abnormality may be carried out in the later data matching process F3.

If the target Disk is successfully recovered in the Disk recovery process F1 (step S713), the PBC module 601 connects the target Disk to the loop (step S714) and then initializes the loop to which the target Disk is connected (steps S715, S716).

As illustrated in FIG. 19, in the data matching process F3, the CM 40 ensures the address information based on the data stored in the update data management table 44 (step S717). The CM 40 generates data for the data match recovery from other Disks based on the address information in the update data management table 44. The CM 40 writes the data into the PBC module 601 for the data match recovery (step S718), the data written into the PBC module 601 are transferred from the PBC module 601 to the target Disk (step S719). The CM 40 then deletes the address information recorded in the update data management table 44 (step S720).

Figure 21:
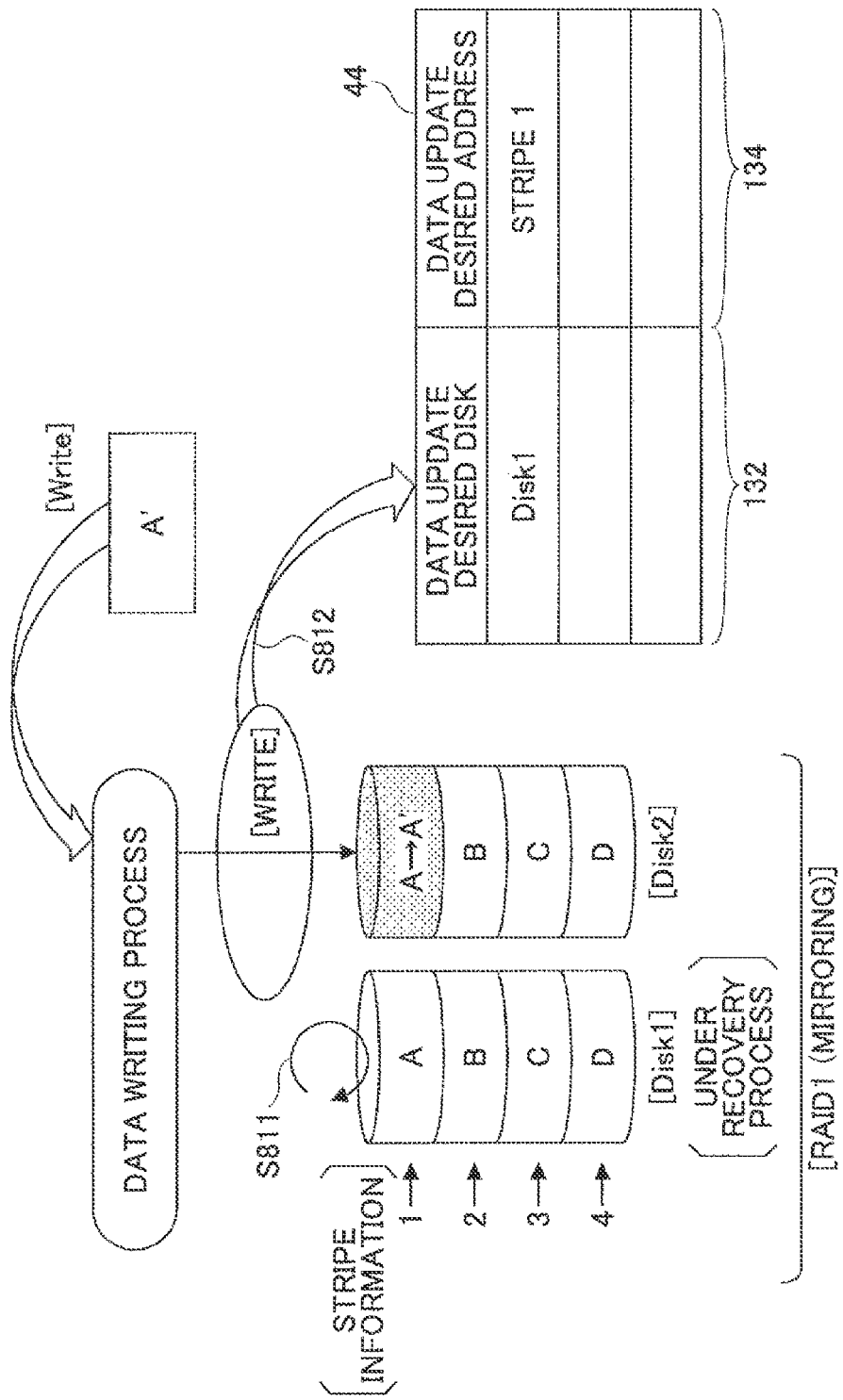
FIG. 21 is a diagram illustrating an example of a data writing process in the redundant configuration while the recovery process is in progress.
Figure 22:
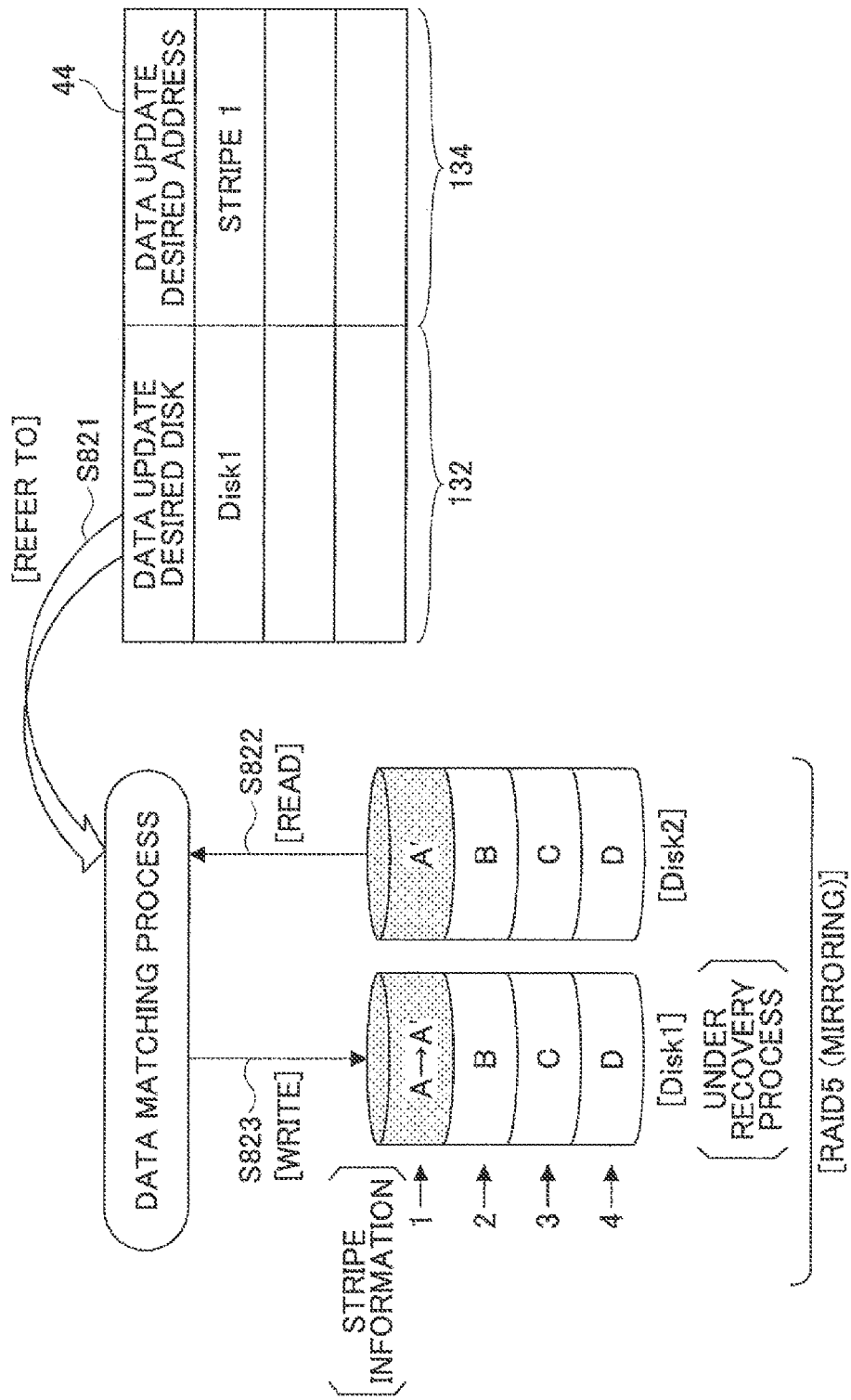
FIG. 22 is a diagram illustrating an example of a data matching process in the redundant configuration while the recovery process is in progress.

Next, contents of the Disk recovery process (read) F1 and Disk recovery process (write) F2 and the Disk recovery process (data matching process) F3 are described with reference to FIGS. 20 to 22. Specifically, FIG. 20 illustrates the data reading process, FIG. 21 illustrates the data writing process, and FIG. 22 illustrates the data matching process.

Specifically, (a) the data reading process, (b) the data writing process, and (c) the data matching process are configured to be executed in a redundant configuration of a RAID 1 (mirroring without parity or striping).

(a) Data Reading Process

Figure 20:
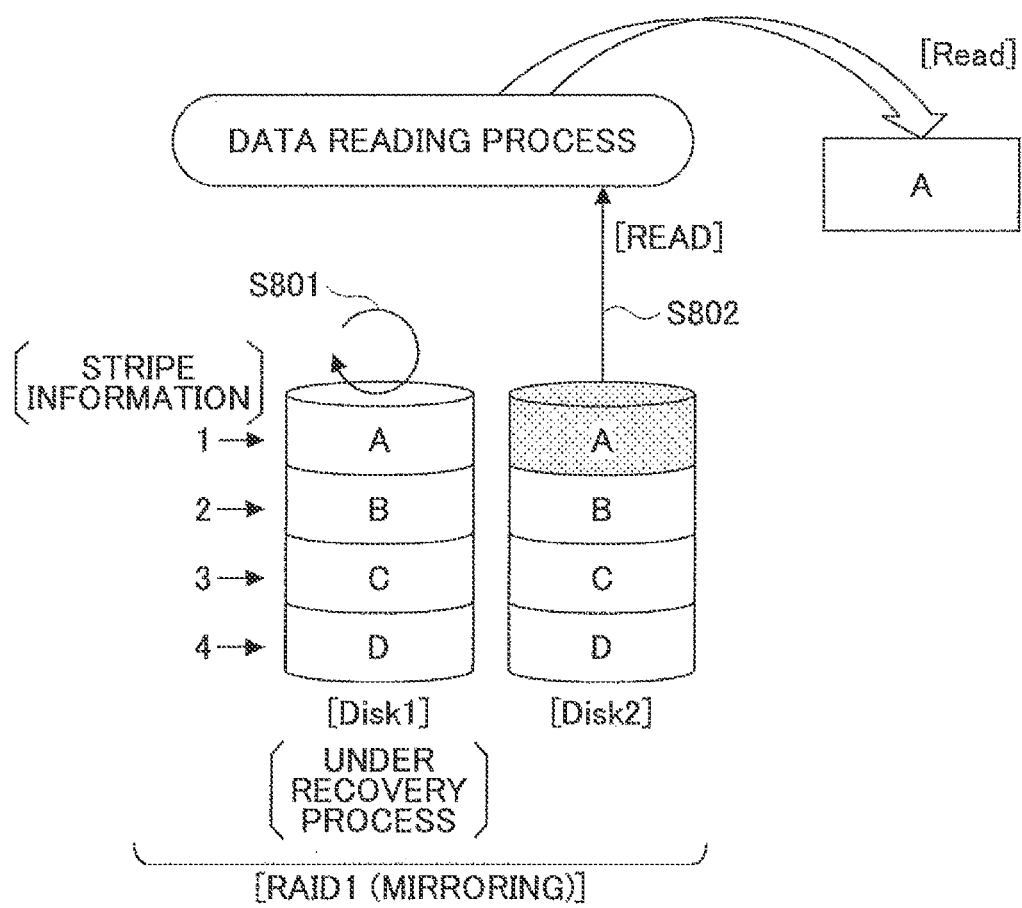
FIG. 20 is a diagram illustrating an example of a data reading process in a redundant configuration of the storage system according to the second embodiment while the recovery process is in progress.

As illustrated in FIG. 20, in the RAID 1 (mirroring without parity or striping) configuration, identical data A, B to D are stored corresponding to identical update data addresses in the Disk 1 and the Disk 2. As illustrated in FIG. 20, in the RAID 1 (mirroring without parity or striping) configuration, identical data A, B to D are stored corresponding to identical update data addresses in the Disk 1 and the Disk 2.

In FIG. 20, the Disk 1 is under the recovery process (step S801). For example, if a data reading process is carried out on the Disk 1 that is under the recovery process, the data A are read from the Disk 2 that stores mirrored data A (i.e., data reading process) instead of the Disk 1 (step S802).

(b) Data Writing Process

As illustrated in FIG. 21, in the RAID 1 (mirroring without parity or striping) configuration, the data A in the Disk 2 (i.e., data writing process) are overwritten with data A' while the Disk 1 undergoes the recovery process (step S811). When the data A in the Disk 2 are overwritten with the data A', the data A stored in the Disk 1 corresponding to stripe information 1 differ from data A' stored in the Disk 2.

In order to prevent a mismatch between data A in the Disk 1 and data A' in the Disk 2, "Disk 1" is recorded in a data update desired Disk section and data address information corresponding to the Disk 1 is recorded in an data update desired address section of the update data management table 44 (step S812). These processes are carried out as preparation of the data matching process (see FIG. 22). Accordingly, in the update data management table 44, "Disk 1" is stored in a data update desired Disk section 132 and "Stripe 1" is stored in a data update desired address section 134.

(c) Data Matching Process

FIG. 22 illustrates a data matching process carried out between the Disks when the Disk recovery process is successful in the RAID 1 (mirroring without parity or striping) configuration. As illustrated in FIG. 22, the update data management table 44 is, to which the contents of the existing data are updated by the writing process, referred to while the data matching process is in progress (step S821). Specifically, data in the data update desired Disk and data in the data update desired address recorded in the update data management table 44 are information to be referred to. Accordingly, "Disk 1" stored in the data update desired Disk section 132 and "Stripe 1" stored in the data update desired address section 134 in the update data management table 44 are referred to while the data matching process is in progress.

In this case, since the Disk 1 is successfully recovered, the data A' are read from the Disk 2 (step S822), the data A corresponding to the stripe 1 in the Disk 1 are overwritten with the data A' (step S823) such that the data A are replaced with the data A'.

Features, advantages, and modification of the storage system 2 according to the second embodiment are described below.

(1) In the second embodiment, the proxy response section 101 is provided in the PBC module 601. The proxy response section 101 is configured to transmit a response to the CM 40 instead of the Disk that is under the recovery process if the CM 40 issues an I/O to the Disk that is under the recovery process. With this configuration, loop initialization for disconnecting the Disk from the loop may not be needed when the PBC module 601 carries out the Disk recovery process on the Disk.

(2) The proxy response section 101 is configured to transmit the response together with the information on the condition to the Disk instead of the Disk that is under the recovery process the CM 40. The CM 40 side includes a function to detect the condition of the Disk (e.g., Recovering, Broken) from the contents of the response. With this configuration, the CM 40 instantly detects the condition of the Disk based on the ordinary I/O process with the Disk. Further, with this configuration, it may not be necessary to determine whether the Disk has failed, and hence, the CM 40 may carry out appropriate processes based on the condition of the Disk.

(3) If the data in the Disk that is under the recovery process are made redundant (i.e., RAID configuration), the CM 40 switches accesses from the Disk in the process to the redundant Disk to carry out the data process on the redundant Disk. With this configuration, even if the Disk is under the recovery process, the I/O process may be continuously carried out. Further, with this configuration, since the I/O process is continuously carried out, the usability of the storage system 2 is significantly improved.

(4) The update data management table 44 is prepared in advance. Accordingly, if the CM 40 writes data into the redundant Disk, the address (e.g., stripe number in RAID) corresponding to which the data are written may be managed by recording the address update data management table 44 as needed.

(5) The storage system 2 includes a function to carry out data matching together with the update data management table 44. With this configuration, when the Disk is successfully recovered, the CM 40 may read the data that are written in the different Disk while the Disk is under the recovery process based on the address information recorded in the update data management table 44. Further, the CM 40 may copy the data written in the different Disk to overwrite the successfully recovered Disk with the copied data to restore data matching in the redundant data. With this configuration, even if data are written in the different Disk while the target Disk is under the recovery process so that data mismatch has occurred between the data in the target Disk and the redundant data in the different Disk, the data mismatch between the two Disks may be adjusted after the successful recovery of the target Disk. That is, if the target Disk is successfully recovered, the target Disk may be used in the same manner as it was used before the target Disk undergoes the recovery process.

(6) In the storage system according to the second embodiment, the Disk recovery process may be carried out and the speed of the Disk recovery process may be increased.

(7) Since the proxy response section 101, 102 to 10N respond to the access request from the CM 40 instead of the failed Disk(s), the Disk diagnostic process or the Disk recovery process may be efficiently controlled.

(8) The Disk recovery process or the Disk diagnostic process (an example of the "Disk recovery process" is mainly illustrated in the specification) in the storage system according to the second embodiment may be applied to disks in a disk array subsystem, and hence, the performance of the disk array subsystem during the recovery process may be significantly improved.

(9) With this configuration, the data may be continuously accessible while the Disk is under the recovery process, and the data redundancy and data matching between the redundant data may be maintained when the Disk is successfully recovered.

(10) With this configuration, the number of loop initializations for the recovery process may be reduced.

(11) In the related art technologies, the loop initialization may need to be performed a maximum of twice in the Disk recovery process. However, in the storage system 2 according to the second embodiment, the number of loop initializations may be reduced to one (when the recovery is successful) or none (when the recovery has failed). Accordingly, duration inaccessible to the same loop may be reduced in the Disk recovery process and hence the performance of the disk array subsystem may be improved.

(12) In the storage system 2 according to the second embodiment, the CM 40 may immediately detect the condition of the Disk. Accordingly, even if the target Disk is under the Disk recovery process, the I/O process may be continuously carried out by utilizing the Disk redundant configuration (i.e., RAID).

(13) In the storage system 2 according to the second embodiment, the write information to be written in the Disk is recorded in a recording section of the update data management table 44. Accordingly, when the Disk is successfully recovered and is restored such that the Disk is ready to be accessed, the data matching process may be easily carried out on the redundant data by referring to the write information recorded in the update data management table 44. That is, with this configuration, maintaining the data match in the redundant data may be simplified. As a result, the redundancy of the data may be maintained in a same manner as the data redundancy before carrying out the Disk recovery process.

[c] Third Embodiment

Figure 23:
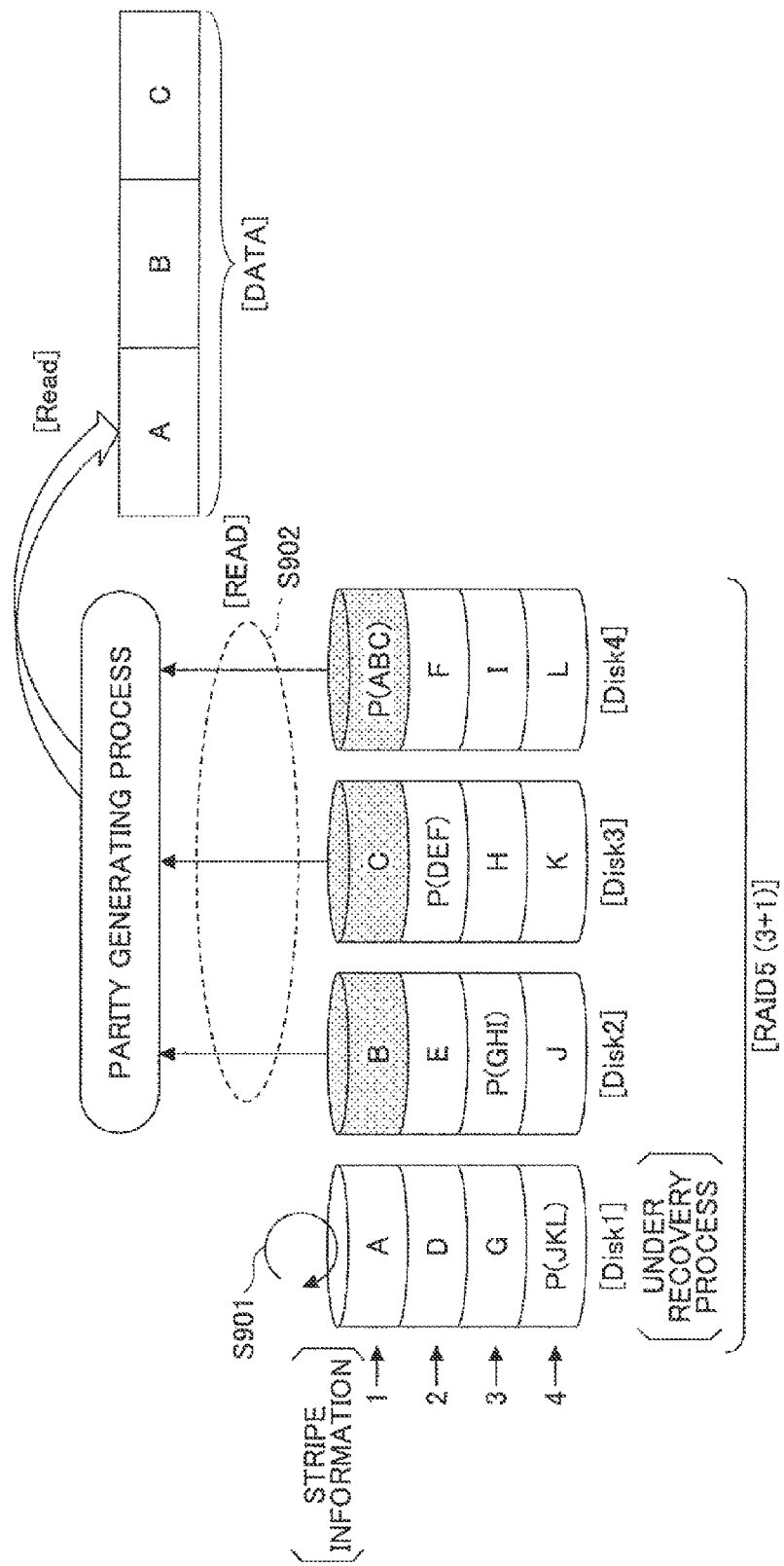
FIG. 23 is a diagram illustrating an example of a data restoring process in a redundant configuration of a storage system according to a third embodiment while a recovery process is in progress.
Figure 24:
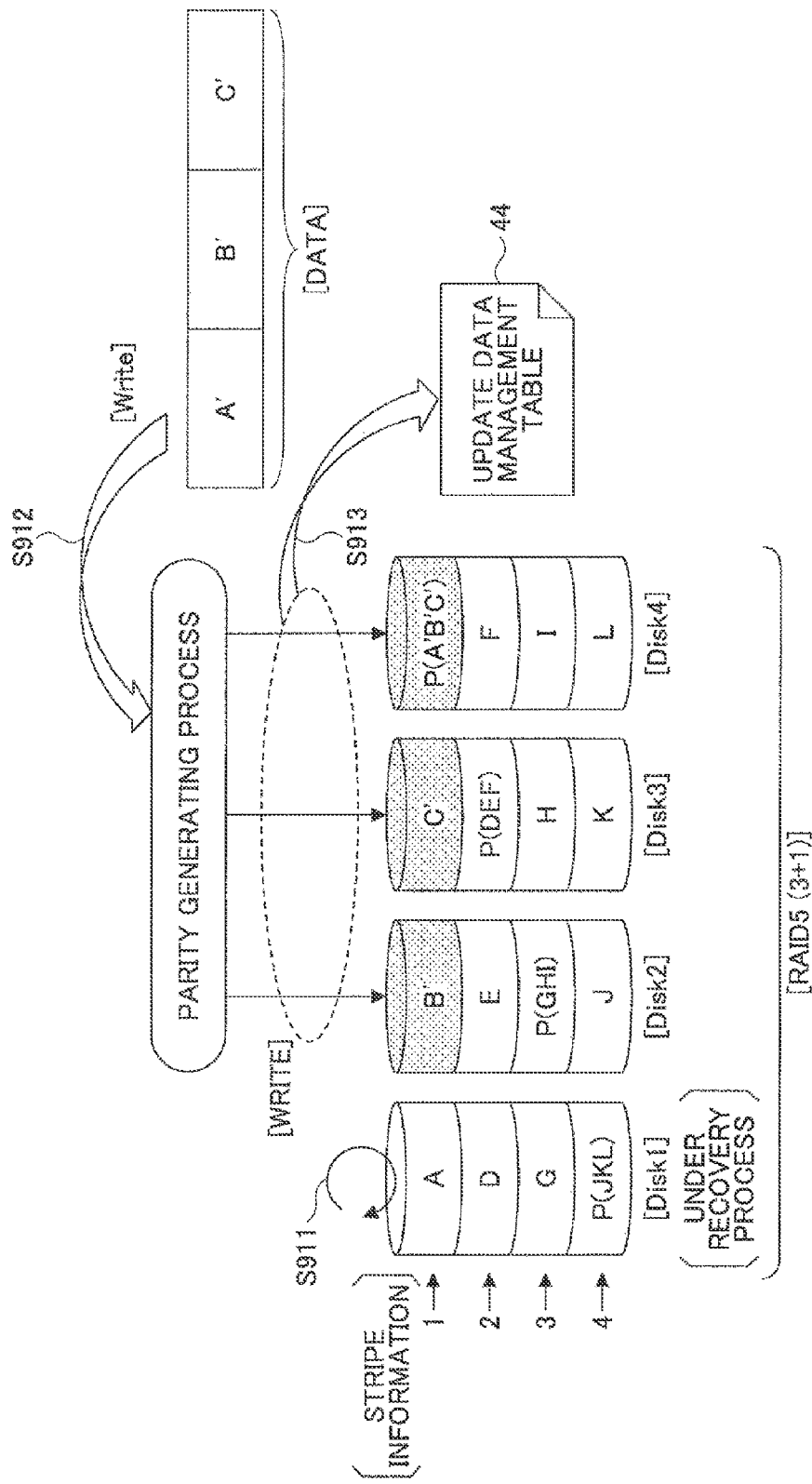
FIG. 24 is a diagram illustrating an example of a parity data generating process in the redundant configuration while the recovery process is in progress.
Figure 25:
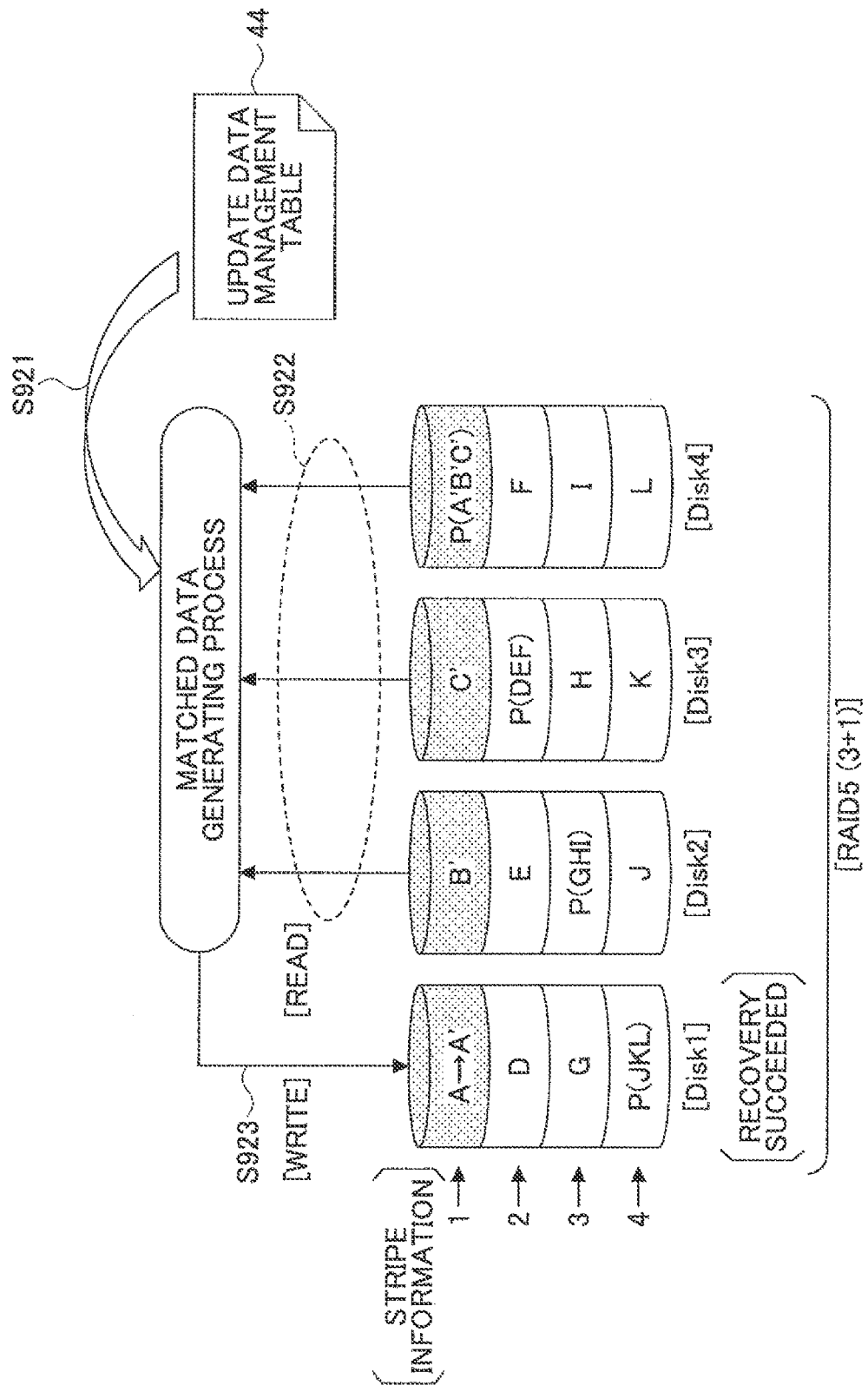
FIG. 25 is a diagram illustrating an example of a data matching data generating process in the redundant configuration while the recovery process is in progress.

Next, contents of the Disk recovery process (data restoration) and the Disk recovery process (parity generation) and the Disk recovery process (matched data generation) are described with reference to FIGS. 23 to 25. FIG. 23 illustrates a data restoring process, FIG. 24 illustrates a parity generating process, and FIG. 25 illustrates a matched data generating process.

Specifically, (a) the data restoring process, (b) the parity generating process, and (c) the matched data generating process are configured to be executed in a redundant configuration of a RAID 5 (striping with distributed parity), which illustrates an example of a storage system according to third embodiment.

(a) Data Restoring Process

The data restoring process is configured to read data in the redundant configuration of the RAID 5. In the RAID 5, the parity, which is recorded as a redundant code for restoring the recorded data, is distributed in all the Disks. As illustrated in FIG. 23, in the RAID 5 (3+1) configuration, data A, B to L are stored in the Disk 1, Disk 2, Disk 3 and Disk 4. The data A, D, G and the parity P (JKL) are stored in the Disk 1, the data B, E, J and the parity P (GHI) are stored in the Disk 2, the data C, H, K and the parity P (DEF) are stored in the Disk 3, and the data F, I, L and the parity P (ABC) are stored in the Disk 4.

In this case, since the Disk 1 is under the recovery process (step S901), the data A, B, and C are read by utilizing the Disk 2, the Disk 3, and the Disk 4 to which the parity (ABC) is distributed (step S902).

(b) Parity Generating Process

A parity generating process is configured to write data in the redundant configuration of the RAID 5. As illustrated in FIG. 24, in the RAID 5 configuration, data B' overwrite the data B in the Disk 2, data C' overwrite the data C in the Disk 3, and data P(A',B',C') overwrite the data P (A,B,C) in the Disk 4 (i.e., data writing process) while the Disk 1 undergoes the recovery process (step S911). When the data P(A,B,C) in the Disk 4 are overwritten with the data P(A',B',C') (step S912), the data A stored in the Disk 1 corresponding to the stripe information 1 differ from data A' stored in the Disk 4.

In order to prevent a mismatch between data A in the Disk 1 and the data A' in the Disk 4, the Disk 1 is recorded in a data update desired Disk section and data address information corresponding to the Disk 1 is recorded in a data update desired address section of the update data management table 44 (step S913). These processes are carried out as preparation of the data matching process (see FIG. 25). Accordingly, in the update data management table 44, the "Disk 1" is stored in the data update desired disk section 132 and the "Stripe 1" is stored in an data update desired address section 134.

(c) Data Matching Process

FIG. 25 illustrates the data matching process carried out between the Disks when the Disk recovery process is successful in the RAID 5 configuration. As illustrated in FIG. 25, the update data management table 44 is, to which the contents of the existing data are updated by the parity generating process, referred to while the data matching process is in progress (step S921). Specifically, the data update desired Disk and the data update desired address recorded in the update data management table 44 are information to be referred to. Accordingly, the "Disk 1" stored in the data update desired Disk section 132 and "Stripe 1" stored in the data update desired address section 134 of the update data management table 44 are referred to while the data matching process is in progress.

In this case, since the Disk 1 is successfully recovered, the data A' are read by utilizing the Disk 2, Disk 3 and Disk 4 (step S922), the data A corresponding to the stripe 1 in the Disk 1 are overwritten with the data A' (step S923) such that the data A are replaced with the data A'.

As described above, even if the redundant data are utilized in the RAID 5 (striping with distributed parity), effects similar to those obtained in the first and second embodiments may be acquired.

Other Embodiments (1) In the second embodiment, although the PBC module 601 is selected from a collection of the PBC modules and illustrated its functions and operations, other PBC modules 602 to 60N may each have similar configurations and functions so that the PBC modules 602 to 60N may also carryout operations similar to those of the PBC module 601.

(2) In the first to third embodiments, the RAID 1 and RAID 5 are illustrated as the examples of the data redundant configuration; however, the data redundant configuration is not limited to the RAID 1 or the RAID 5. That is, other types of data redundant configurations may be combined with the RAID 1 or with the RAID 5 disclosed in the storage system and the control method according to the first to third embodiments.

(3) In the second embodiment, the Disks 711, 712 to 71N are illustrated as examples of the storage device; however, the storage devices are not limited to the Disks 711, 712 to 71N. That is, recording media may be used as the storage devices in the storage system and the control method according to the first to third embodiments.

(4) In the first to third embodiments, the storage device information and the address information are illustrated with reference to FIG. 8 as the examples of the information utilized for data matching; however, the information utilized for data matching is not limited to the storage device information and the address information. The address information may not only include a destination to which the data are stored but also include data specifying information.

Comparative Example

A comparative example discussed herein is a disk array subsystem. In the comparative example of the disk array subsystem, if specific abnormality is detected from the Disks in the disk array subsystem, the detected abnormality is temporarily eliminated such that the Disks may be continuously utilized. Specifically, the comparative example of the disk array subsystem includes functions of the Disk recovery process and the Disk diagnostic process so that the detected abnormality is temporarily eliminated such that the Disks may be continuously utilized.

(1) Disk Recovery Process Function

The Disk recovery process function indicates a function to carryout the recovery process such as software reset or hardware reset for the corresponding Disks.

(2) Disk Diagnostic Process Function

The Disk diagnostic function is similar to the Disk recovery process function that may test or diagnose the corresponding Disks. When the Disk diagnostic function is executed and potential abnormality is detect as a result, the Disk diagnostic function subsequently determines whether the target Disks may normally and continuously be utilized.

Figure 26:
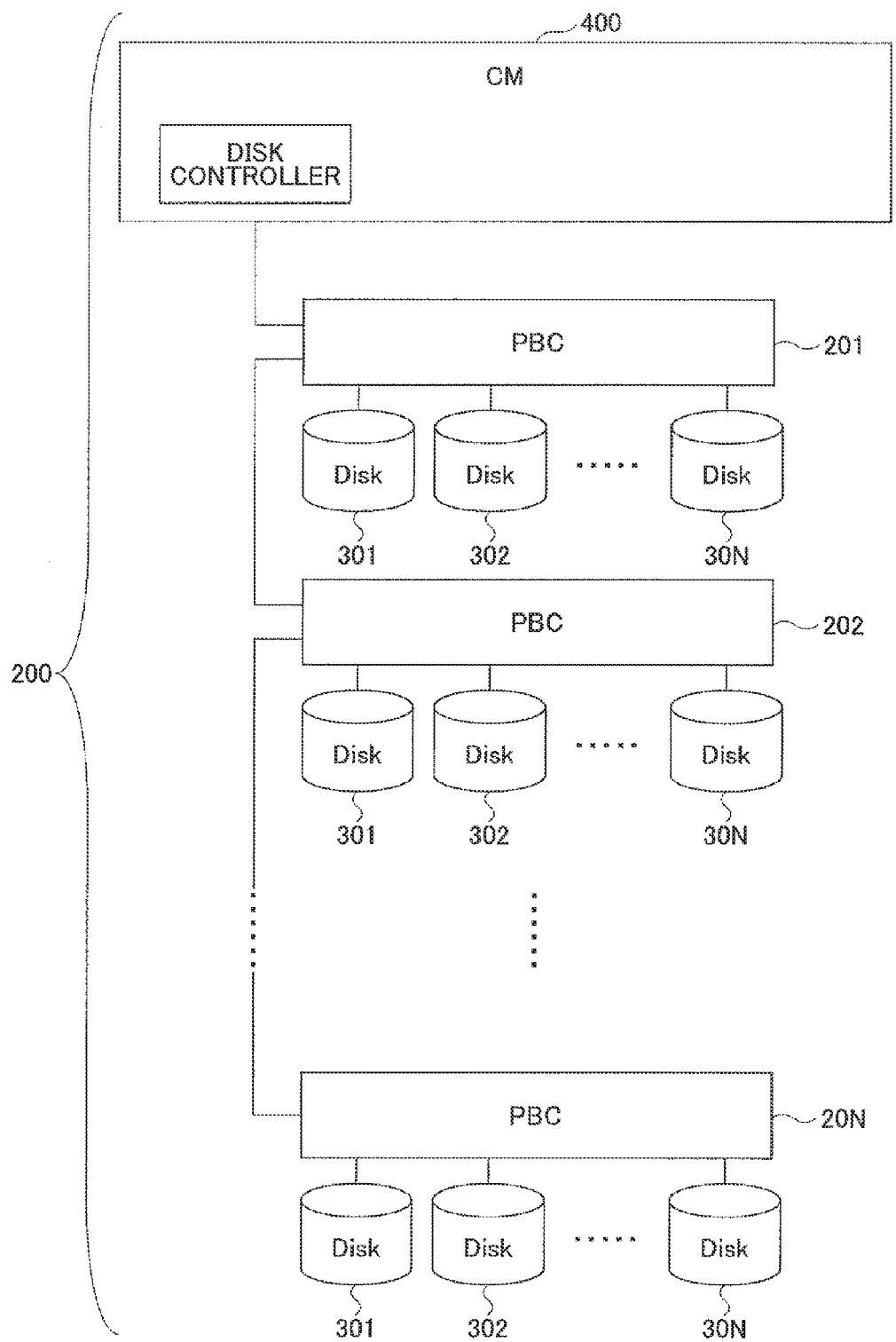
FIG. 26 is a diagram illustrating a comparative example of a storage system.

Next, the disk array subsystem is described with reference to FIGS. 26 to 27. The disk array subsystem 200 includes PBC modules 201, 202 to 20N that are configured to execute the aforementioned Disk recovery process function or the Disk diagnostic function to directly monitor and control the Disks.

When the Disk recovery process is conducted, the PBC 201 disconnects Disk subject to the recovery process (i.e., target Disk) from a backend loop that connects the Disk 301, 302 to 30N, and subsequently initializes the loop to logically disconnect the target Disk 30N from the backend loop. This process may be carried out for completely disconnecting the target Disk 30N from the backend loop to prevent an adverse effect on the I/O process or generation of loop abnormality. That is, first, the Disk 30N is physically and logically disconnected from the backend loop such that the recovery process carried out on the Disk 30N may not adversely affect the I/O processes of other Disks within the backend loop. Second, the Disk 30N is physically and logically disconnected from the backend loop such that even if the CM 400 issues I/Os to the Disk 30N that is under the recovery process, abnormality may not be occurred in the loop to which other Disks are connected.

After the complete disconnection of the target Disk 30N, the PBC 201 executes the recovery process on the target Disk 30N. If the target Disk 30N is continuously usable as a result of the recovery process, the target Disk 30N is connected to the backend loop again to be incorporated within the backend loop. After the reconnection of the Disk 30N to the backend loop, the loop is initialized such that the CM 400 may be able to issue I/Os to the Disk 30N.

In this case, if the target Disk 30N is not continuously usable as the result of the recovery process, the target Disk 30N remains disconnected from the backend loop, and the target Disk 30N is determined as a "Broken" condition in the disk array subsystem.

As illustrated in FIG. 27, the PBC 201 includes an address management table 500 that stores address and access destination port combinations.

Figure 28:
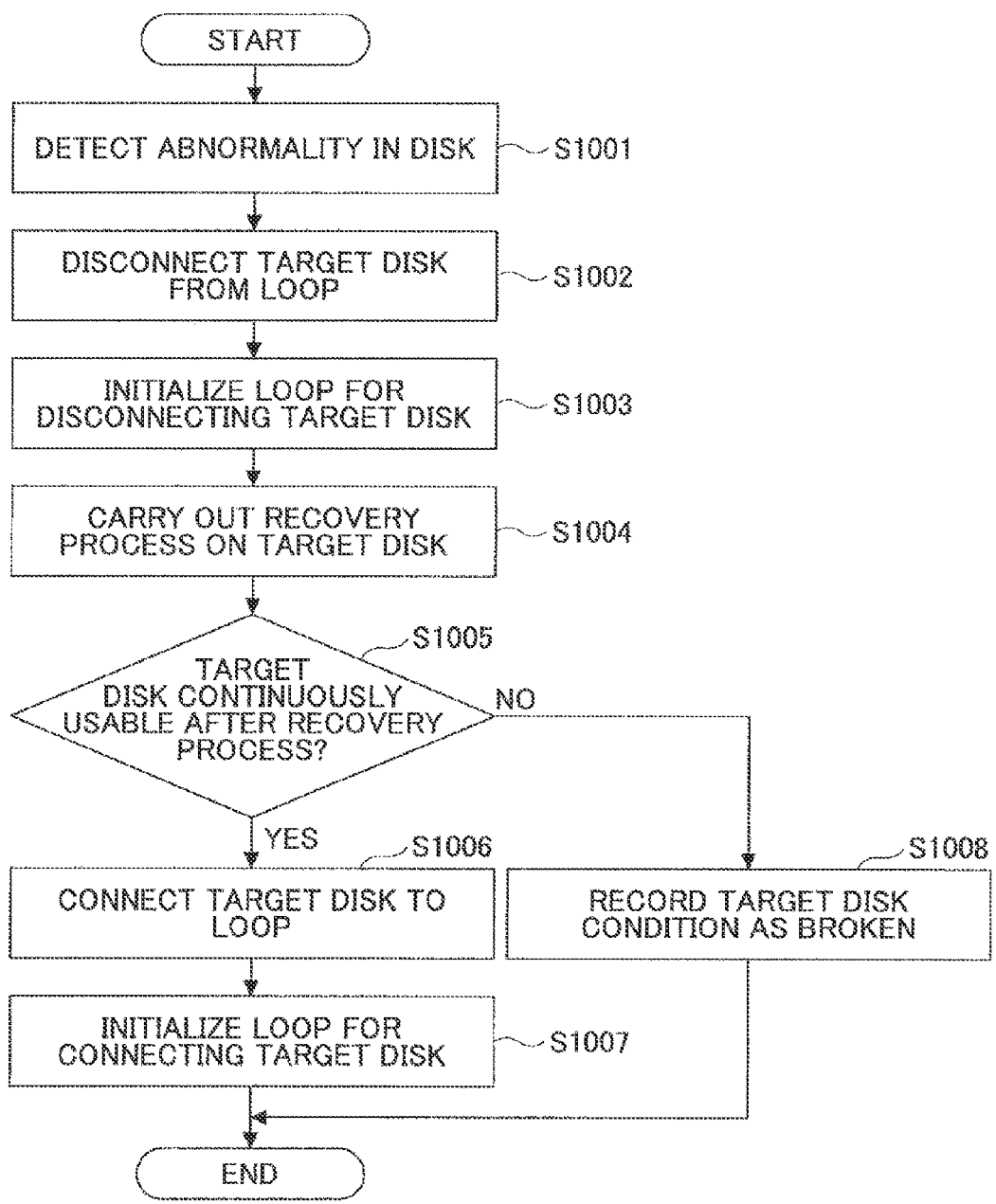
FIG. 28 is a flowchart illustrating a sequence of a disk recovery process carried out in the comparative example of the storage system.

FIG. 28 is a flowchart illustrating a sequence of a disk recovery process carried out in the comparative example of the disk array subsystem. As illustrated in FIG. 28, in the Disk recovery process, specific abnormality of the Disk (target Disk) is detected (step S1001) and the target Disk is disconnected from the loop (step S1002). The loop is then initialized for the disconnection of the target Disk from the loop (step S1003), and the recovery process is carried out on the target Disk (step S1004). Subsequently, whether the target Disk is continuously usable is determined as a result of the recovery process (step S1005). If the target Disk that is continuously usable ("YES" in step S1005), the target Disk is connected to the loop again (step S1006) and the loop is initialized for connecting the target Disk to the loop again (step S1007, thereby ending the process. If, on the other hand, the target Disk is not usable ("NO" in step S1005), the condition of the target Disk is recorded as broken (step S1008).

In the CM 400 configured to issue I/Os to the Disk, if the existing process is executed in the PBC 201, the disconnection of the Disk from the backend loop may be detected by the loop initialization process of the PBC 201 and the I/O issuing to the target Disk may temporarily be suspended. Thereafter, the loop initialization is executed again within a predetermined time. As a result, if the Disk is reconnected to the loop (or incorporated into the loop), the suspended I/O process is restarted. Further, if the Disk is not incorporated into the loop within the predetermined time, the condition of the Disk is recorded as broken, and the suspended I/O process is subject to an error process.

Thus, if the I/O is not continuously issued to the specific Disk subject to disconnection from the loop within the predetermined time, the CM 400 determines the condition of the Disk as broken.

Figure 29:
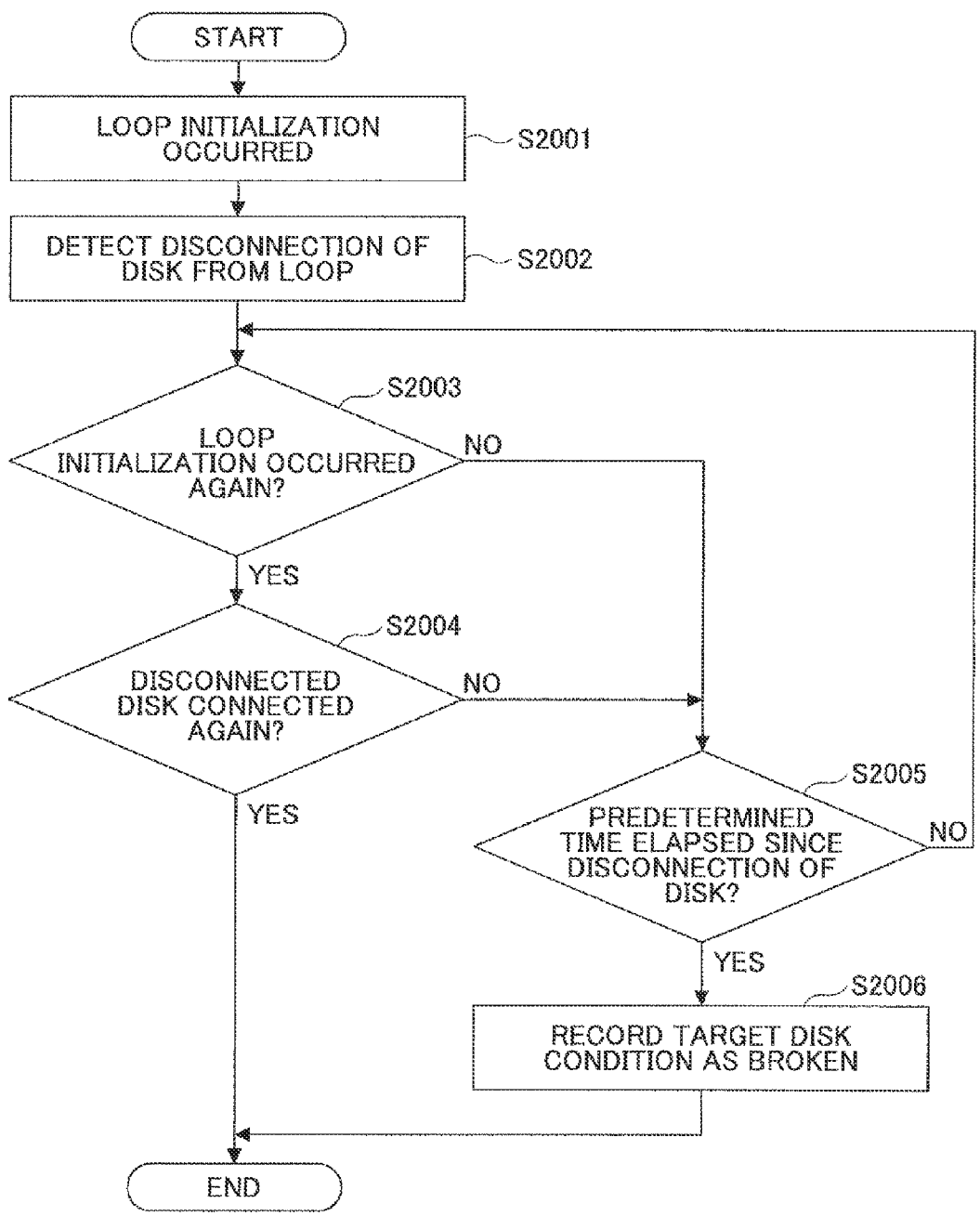
FIG. 29 is a flowchart illustrating a sequence of a disk failure diagnostic process carried out in the comparative example of the storage system.

FIG. 29 is a flowchart illustrating a sequence of a disk failure diagnostic process carried out in the comparative example of the disk array subsystem. As illustrated in FIG. 29, in the disk failure diagnostic process, when the loop initialization has occurred (step S2001), the target Disk is disconnected from the loop (step S2002). After having disconnected the target Disk, whether the loop initialization has occurred again is determined (step S2003). If the loop initialization has occurred again ("YES" in step S2003), whether the disconnected target Disk is connected to the loop is subsequently determined (step S2004). If the disconnected target Disk has been connected to the loop again ("YES" in step S2004) is determined, the disk failure diagnostic process is ended.

If, on the other hand, the loop initialization has not occurred again ("NO" in step S2003), or if the disconnected target Disk has not been connected to the loop again ("NO" in step S2004), whether a predetermined time has elapsed since the target Disk has been disconnected is determined (step S2005). If the predetermined time has elapsed since the disconnection of the target Disk ("YES" in step S2005), the condition of the target Disk is recorded as broken (step S2006), thereby ending the process.

However, the disk recovery process or the disk diagnostic process carried out in the comparative disk array subsystem may have following adverse effects.

(1) The suspended time of issuing I/O addressed to the target Disk under the recovery process may be increased. When the recovery process is initiated, the CM 400 suspends issuing of the I/Os until the recovery process is complete and the target Disk is reconnected to the backend loop or until the predetermined time, with which the condition of the target Disk is determined as broken, has elapsed. Accordingly, in the disk array subsystem, the access request from the host may not be processed temporarily, which may adversely affect the entire performance of the disk array subsystem, unlike the storage system according to the embodiments.

(2) Accesses to all the Disks within the backend loop may temporarily be interrupted every time the loop is initialized. Duration of the loop initialization may become longer in proportion to the size of the disk array subsystem configuration (i.e., the numbers of disks and controllers). In the disk array subsystem, accesses to all the Disks within the loop may be interrupted while the loop is initialized. Accordingly, accesses to all the Disks within the backend loop may temporarily be interrupted every time the loop is initialized, and the duration of the access interruption may become longer based on the size of the disk array subsystem configuration. In the sequence of the disc recovery process or the disk diagnostic process conducted by the PBC, the loop may be initialized a maximum of twice. The increase in the duration of the access interruption may adversely affect the performance of the disk array subsystem.

(3) When the PBC has detected the Disk abnormality and automatically executes (1) the disk recovery process or (2) the disk diagnostic process, the CM 400 may not be able to detect whether the target Disk 30N is in the process of recovery or whether the PBC has already determined the condition of the target Disk 30N as broken. Accordingly, even if the PBC has determined the target Disk as broken and the target Disk has already been disconnected, the CM 400 may not detect the fact that the condition of the Disk has been determined as broken until the predetermined time has elapsed since the Disk 30N has been disconnected from the backend loop. In the disk array subsystem, even if a mechanism configured to transmit and receive the conditions of the Disks is provided between the PBC and CM 400, the CM 400 may still need a substantially long time for detecting the conditions of the Disks. This is because such process of transmitting or receiving the conditions of the Disks may differ from the ordinary I/O processes.

(4) Even if the target Disk is continuously usable after the recovery process carried out on the target Disk but the recovery process has taken the predetermined time, the CM 400 may determine the condition of the target Disk as broken before the time consumed for the recovery process has elapsed.

The above adverse effects that may occur in the comparative example of the disk array subsystem may not be observed in the storage system according to the above embodiments.

The storage system according to the embodiments is configured such that if a target one of the storage devices, to which the access request is transmitted from the controller, has failed, the proxy response section transmits the response to the access request instead of the target storage device.

In addition, a method for controlling the storage system includes controlling an access to at least one of the storage devices, transmitting an access request for controlling the access to the storage device, and transmitting a response to the access request instead of the storage device to which the access requests is addressed.

The storage system or the method for controlling the storage system according to the embodiments may provide the following advantages.

(1) If one or more the storage devices have failed, the corresponding proxy response sections may transmit appropriate responses instead of the failed storage devices. Accordingly, the speed of the response process may be increased.

(2) The recovery process or the diagnostic process may be carried out on the corresponding storage devices after or while the proxy response sections transmit the responses instead of the failed storage devices, which may enable the proxy response sections to carry out the recovery process or the diagnostic process separately from the controller side processes. Accordingly, an adverse effect due to the recovery process or the diagnostic process on the controller side processes may be reduced.

Although the preferred embodiments of the storage system and the method for controlling the storage system are described above, the invention may not be limited to the illustrated embodiments. Various alterations or modifications may be made by those skilled in the art based on the scope of the claims or the gist of the embodiments, and the alterations and modifications made are included in the scope of the invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. A storage system comprising:
    a plurality of storage devices;
    a controller configured to transmit an access request for controlling an access to at least one of the storage devices;
    a switching part configured to receive the access request from the controller to select the at least one of the storage devices based on the access request received therefrom; and
    a proxy response part configured to determine whether the proxy response part needs to forward the access request to a selected storage device based on address management information including an address determined in loop initialization and condition information of the selected storage device, and to transmit, if the selected storage device has failed, a response including the condition information of the selected storage device to the access request instead of the failed storage device responding.

2. The storage system as claimed in claim 1, further comprising:
    a condition information storage part configured to store respective condition information of the storage devices, wherein
    the proxy response part transmits the response to the access request instead of the failed storage device responding based on the condition information of the failed storage device stored in the condition information storage part.

3. The storage system as claimed in claim 1, further comprising:
    a loop configured to circulate information between the controller and the storage devices.

4. The storage system as claimed in claim 3, further comprising:
    a failure detector configured to detect failures of the storage devices, wherein
    if the failure detector detects a failure of at least one of the storage devices, the switching part disconnects the failed storage device from the loop circulating information between the controller and the storage devices.

5. The storage system as claimed in claim 1, wherein the failed storage device undergoes a recovery process while the proxy response part transmits the response to the access request instead of the failed storage device responding.

6. The storage system as claimed in claim 1, wherein the storage devices form a RAID configuration such that the RAID configured storage devices store shared information therebetween.

7. The image forming apparatus as claimed in claim 1, further comprising:
    a matching information storing part configured to store, if any one of the storage devices that store shared information includes mismatched information differing from the shared information, one of storage device information and address information is utilized for matching the mismatched information with the shared information.

8. The storage system as claimed in claim 1, wherein the controller includes a storage information storing part configured to store storage information received from the proxy response part.

9. The storage system as claimed in claim 8, wherein the controller accesses the proxy response part to update the storage information stored in the storage information storing part at any time or at a predetermined time interval.

10. The storage system as claimed in claim 1, wherein the storage devices are each a recording disk or a disk drive.

11. The storage system as claimed in claim 1, wherein the switching part includes the proxy response part.

12. A method for controlling a storage system including a controller, storage devices, a switching part and a proxy response part, the method comprising:
    transmitting from the controller an access request for controlling an access to at least one of the storage devices;
    receiving the access request transmitted from the controller to cause the switching part to select the at least one of the storage devices based on the received access request;
    determining, by the proxy response part, whether the proxy response part needs to forward the access request to a selected storage device based on address management information including an address determined in loop initialization and condition information of the selected storage device; and
    transmitting, if the selected storage device has failed, a response including the condition information of the selected storage device to the access request by the proxy response part instead of the failed storage device responding.

13. The method as claimed in claim 12, further comprising:
    storing condition information of the storage devices in a condition information storage part.

14. The method as claimed in claim 12, further comprising:
    performing a recovery process on the failed storage device while transmitting the response to the access request instead of the failed storage device responding.

15. The method as claimed in claim 12, further comprising:
    detecting a failure of at least one of the storage devices; and
    disconnecting the failed storage device from a loop via which information is circulated between the controller and the storage devices.

16. The method as claimed in claim 12, further comprising:
    matching, if any of the storage devices that store shared information includes mismatched information differing from the shared information, the mismatched information with the shared information.

17. The method as claimed in claim 12, wherein the switching part includes the proxy response part.

* * * * *